(12) United States Patent
Cherian et al.

(10) Patent No.: US 9,191,977 B2
(45) Date of Patent: Nov. 17, 2015

(54) SYSTEMS AND METHODS FOR FAST INITIAL NETWORK LINK SETUP

(71) Applicant: Qualcomm Incorporated, San Diego, CA (US)

(72) Inventors: George Cherian, San Diego, CA (US); Santosh Paul Abraham, San Diego, CA (US); Simone Merlin, San Diego, CA (US)

(*) Notice: Subject to any disclaimer, the term of this patent is extended or adjusted under 35 U.S.C. 154(b) by 97 days.

(21) Appl. No.: 13/662,409

(22) Filed: Oct. 26, 2012

(65) Prior Publication Data

US 2013/0107738 A1 May 2, 2013

Related U.S. Application Data

(60) Provisional application No. 61/552,995, filed on Oct. 28, 2011, provisional application No. 61/556,044, filed on Nov. 4, 2011, provisional application No. 61/586,600, filed on Jan. 13, 2012, provisional application No. 61/622,324, filed on Apr. 10, 2012, provisional application No. 61/640,545, filed on Apr. 30, 2012.

(51) Int. Cl.
*H04W 4/00* (2009.01)
*H04W 76/02* (2009.01)
*H04W 48/06* (2009.01)

(52) U.S. Cl.
CPC ............ *H04W 76/021* (2013.01); *H04W 48/06* (2013.01); *H04W 76/02* (2013.01)

(58) Field of Classification Search
CPC ..... H04W 48/04; H04W 48/06; H04W 48/18; H04W 74/00; H04W 76/00; H04W 76/02; H04W 76/021
USPC .................................. 370/229–252, 328–342
See application file for complete search history.

(56) References Cited

U.S. PATENT DOCUMENTS 6,496,475 B1\* 12/2002 Ji et al. .......................... 370/216
7,610,053 B2 10/2009 Funato et al.
(Continued)

FOREIGN PATENT DOCUMENTS

CN       1839569 A    9/2006
CN    101361309 A    2/2009
(Continued)

OTHER PUBLICATIONS

International Search Report and Written Opinion—PCT/US2012/062471—ISA/EPO—Mar. 14, 2013.
(Continued)

*Primary Examiner* — Kan Yuen
(74) *Attorney, Agent, or Firm* — Joseph Hanasz

(57) ABSTRACT

Systems and methods for communicating in a wireless communication system are described. Various processes for reducing the initial link set up time are described. In one aspect a method in a wireless communication system is provided. The method includes providing a network service configured to communicate via a plurality of channels. The method further includes determining a characteristic of the network service comprising a load value for each of the plurality of channels. The method further includes transmitting an identifier of the characteristic of the network service for obtaining the network service in the wireless communication system.

24 Claims, 16 Drawing Sheets

(56) References Cited

U.S. PATENT DOCUMENTS

| | | |
|---|---|---|
| 7,684,358 B2 | 3/2010 | Kim et al. |
| 7,808,947 B2 | 10/2010 | Iyer |
| 8,285,283 B2 | 10/2012 | Hande et al. |
| 8,331,303 B2 | 12/2012 | Gupta et al. |
| 8,442,529 B2 | 5/2013 | Patil et al. |
| 8,953,598 B2 | 2/2015 | Zhang et al. |
| 2001/0029615 A1 | 10/2001 | Shirakawa |
| 2002/0118664 A1 | 8/2002 | Ishibashi et al. |
| 2004/0066756 A1 | 4/2004 | Ahmavaara et al. |
| 2005/0030922 A1 | 2/2005 | Lee et al. |
| 2005/0047371 A1 | 3/2005 | Bennett |
| 2005/0120354 A1* | 6/2005 | Sunada et al. ............ 719/310 |
| 2005/0254435 A1* | 11/2005 | Moakley et al. ............ 370/252 |
| 2006/0040663 A1 | 2/2006 | Ise et al. |
| 2006/0092871 A1 | 5/2006 | Nishibayashi et al. |
| 2006/0114839 A1 | 6/2006 | Meier et al. |
| 2006/0182055 A1 | 8/2006 | Coffee et al. |
| 2006/0203774 A1* | 9/2006 | Carrion-Rodrigo ........ 370/331 |
| 2007/0165584 A1 | 7/2007 | Ponnampalam et al. |
| 2007/0195725 A1 | 8/2007 | Iino et al. |
| 2007/0206554 A1* | 9/2007 | Laroia et al. ............... 370/338 |
| 2007/0217343 A1 | 9/2007 | Znamova et al. |
| 2007/0217377 A1* | 9/2007 | Takeuchi .................... 370/338 |
| 2007/0247395 A1* | 10/2007 | Barraclough et al. ........ 345/51 |
| 2008/0049703 A1 | 2/2008 | Kneckt et al. |
| 2009/0046682 A1 | 2/2009 | Kim et al. |
| 2009/0093232 A1 | 4/2009 | Gupta et al. |
| 2009/0219816 A1 | 9/2009 | Rezaiifar |
| 2009/0245176 A1 | 10/2009 | Balasubramanian et al. |
| 2009/0252165 A1 | 10/2009 | Zhang et al. |
| 2009/0299836 A1 | 12/2009 | Sachs et al. |
| 2010/0020746 A1 | 1/2010 | Zaks |
| 2010/0091732 A1 | 4/2010 | Roeder et al. |
| 2010/0157796 A1 | 6/2010 | Chin et al. |
| 2010/0165905 A1 | 7/2010 | Kanazawa et al. |
| 2010/0195497 A1 | 8/2010 | Iyer et al. |
| 2010/0202339 A1 | 8/2010 | Chieng et al. |
| 2010/0203890 A1 | 8/2010 | Nagaraja et al. |
| 2010/0238859 A1 | 9/2010 | Vukovic et al. |
| 2010/0278128 A1 | 11/2010 | Lee et al. |
| 2011/0026503 A1 | 2/2011 | Mueck et al. |
| 2011/0103230 A1 | 5/2011 | Iyer |
| 2011/0117889 A1 | 5/2011 | Burgess et al. |
| 2011/0199898 A1 | 8/2011 | Cho et al. |
| 2012/0178416 A1 | 7/2012 | Miklos et al. |
| 2012/0307685 A1 | 12/2012 | Kim et al. |
| 2013/0094536 A1 | 4/2013 | Hui et al. |
| 2013/0107703 A1 | 5/2013 | Cherian et al. |
| 2013/0107757 A1 | 5/2013 | Cherian et al. |
| 2013/0107788 A1 | 5/2013 | Cherian et al. |
| 2013/0107824 A1 | 5/2013 | Cherian et al. |
| 2013/0107825 A1 | 5/2013 | Cherian et al. |
| 2013/0111044 A1 | 5/2013 | Cherian et al. |
| 2013/0203424 A1 | 8/2013 | Van et al. |

FOREIGN PATENT DOCUMENTS

| | | | |
|---|---|---|---|
| CN | 101969635 | A | 2/2011 |
| EP | 1307059 | A1 | 5/2003 |
| EP | 2320706 | A1 | 5/2011 |
| EP | 2555562 | A1 | 2/2013 |
| GB | 2339994 | A | 2/2000 |
| JP | 2002051368 | A | 2/2002 |
| JP | 2002252620 | A | 9/2002 |
| JP | 2003259436 | A | 9/2003 |
| JP | 2004140614 | A | 5/2004 |
| JP | 2005057728 | A | 3/2005 |
| JP | 2006060322 | A | 3/2006 |
| JP | 2007028304 | A | 2/2007 |
| JP | 2008514128 | A | 5/2008 |
| JP | 2009516972 | A | 4/2009 |
| JP | 2009537898 | A | 10/2009 |
| JP | 2011523256 | A | 8/2011 |
| WO | 2006032046 | A1 | 3/2006 |
| WO | 2007060093 | A1 | 5/2007 |
| WO | 2007080490 | A1 | 7/2007 |
| WO | 2007136622 | A2 | 11/2007 |
| WO | 2008049213 | A1 | 5/2008 |
| WO | 2008147130 | A2 | 12/2008 |
| WO | 2009134288 | A1 | 11/2009 |
| WO | 2010107584 | A1 | 9/2010 |
| WO | 2011090257 | A1 | 7/2011 |
| WO | 2011100540 | A1 | 8/2011 |

OTHER PUBLICATIONS

Nokia: "Network Selection for WLAN Access", 3GPP Draft; S2-022860, 3rd Generation Partnership Project (3GPP), Mobile Competence Centre ; 650, Route Des Lucioles ; F-06921 Sophia Antipolis Cedex; France,vol. SA WG2, no. Beijing, china; Oct. 9, 2002, XP050241031, [retrieved on Oct. 9, 2002] the whole document.

Abraham S, et al., "Access Delay Reduction for FILS: Network Discovery & Access congestion Improvements", IEEE 802.11-11/1523r6, Nov. 2011, slides 1-11, URL, https://mentor.ieee.org/802.11/dcn/11/11-11-1523-06-00ai-access-delay-reduction-for-fils.pptx.

* cited by examiner

SYSTEMS AND METHODS FOR FAST INITIAL NETWORK LINK SETUP

CROSS-REFERENCE TO RELATED APPLICATIONS

This application claims the benefit of U.S. Provisional Patent Application No. 61/552,995, entitled "Systems and Methods for Fast Initial Network Link Setup," filed Oct. 28, 2011, which is incorporated by reference in its entirety. This application also claims the benefit of U.S. Provisional Patent Application No. 61/556,044, entitled "Systems and Methods for Fast Initial Network Link Setup," filed Nov. 4, 2011, which is incorporated by reference in its entirety. This application also claims the benefit of U.S. Provisional Patent Application No. 61/586,600, entitled "Systems and Methods for Fast Initial Network Link Setup," filed Jan. 13, 2012, which is incorporated by reference in its entirety. This application also claims the benefit of U.S. Provisional Patent Application No. 61/622,324, entitled "Systems and Methods for Fast Initial Network Link Setup," filed Apr. 10, 2012, which is incorporated by reference in its entirety. This application also claims the benefit of U.S. Provisional Patent Application No. 61/640,545, entitled "Systems and Methods for Fast Initial Network Link Setup," filed Apr. 30, 2012, which is incorporated by reference in its entirety.

BACKGROUND

1. Field

The present application relates generally to wireless communication systems and more specifically to systems, methods, and devices for fast initial network link setup within wireless communication systems.

2. Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or when the network architecture is formed in an ad hoc, rather than fixed, topology. A mobile network element such as a wireless station (STA) and an access point (AP) can exchange messages through a process of link setup for utilizing the network. Under certain conditions, many STAs can attempt to use the network during a short period of time. For example, when several STAs move into the vicinity of a new network, the network can experience an increased rate of link setup process collisions creating undesirable latencies in the link setup. Accordingly, there is a need for a fast initial link setup in a wireless communication network.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include fast initial network link setup wireless communication systems for access points and devices.

One aspect of the subject matter described in the disclosure provides a method of reducing signaling during link setup in a wireless communication system. The method includes transmitting, from an access point, at least first and second network domain identifiers, each of the network domain identifiers being associated with a respective network service, the network domain identifiers having a first number of bits. The method further includes receiving, from a first device, an access request message for establishing the network service associated with at least one of the network domain identifiers, the access request message including a third network domain identifier associated with a plurality of network services, the third network domain identifier including a sequence of bits based on the first or second identifier, the bit length of the sequence of bits being less than the first number of bits. The method further includes broadcasting, from the access point, to a plurality of devices comprising the first device, an access response message establishing a link with the first device and including the first identifier, in response to receiving the access request message.

Another aspect of the subject matter described in the disclosure provides an apparatus configured to reduce signaling during link setup in a wireless communication system. The apparatus includes a transmitter configured to transmit least first and second network domain identifiers, each of the network domain identifiers being associated with a respective network service, the network domain identifiers having a first number of bits. The apparatus further includes a receiver configured to receive, from a first device, an access request message for establishing the network service associated with at least one of the network domain identifiers, the access request message including a third network domain identifier associated with a plurality of network services, the third network domain identifier including a sequence of bits based on the first or second identifier, the bit length of the sequence of bits being less than the first number of bits. The transmitter is further configured to broadcast, to a plurality of devices comprising the first device, an access response message establishing a link with the first device and including the first identifier, in response to receiving the access request message.

Another aspect of the subject matter described in the disclosure provides another apparatus for reducing signaling during link setup in a wireless communication system. The apparatus includes means for transmitting, from an access point, at least first and second network domain identifiers, each of the network domain identifiers being associated with a respective network service, the network domain identifiers having a first number of bits. The apparatus further includes means for receiving, from a first device, an access request message for establishing the network service associated with at least one of the network domain identifiers, the access request message including a third network domain identifier associated with a plurality of network services, the third network domain identifier including a sequence of bits based on the first or second identifier, the bit length of the sequence of bits being less than the first number of bits. The apparatus further includes means for broadcasting, from the access point, to a plurality of devices comprising the first device, an access response message establishing a link with the first device and including the first identifier, in response to receiving the access request message.

Another aspect of the subject matter described in the disclosure provides a computer-readable storage medium comprising instructions executable by a processor of an apparatus in a wireless communication system. The instructions cause the apparatus to transmit, from an access point, at least first and second network domain identifiers, each of the network domain identifiers being associated with a respective network service, the network domain identifiers having a first number of bits. The medium further includes code that, when executed, causes the apparatus to receive, from a first device, an access request message for establishing the network service associated with at least one of the network domain identifiers, the access request message including a third network domain identifier associated with a plurality of network services, the third network domain identifier including a sequence of bits based on the first or second identifier, the bit length of the sequence of bits being less than the first number of bits. The medium further includes code that, when executed, causes the apparatus to broadcast, from the access point, to a plurality of devices comprising the first device, an access response message establishing a link with the first device and including the first identifier, in response to receiving the access request message.

Another aspect of the subject matter described in the disclosure provides another method of reducing signaling during link setup in a wireless communication system. The method includes receiving, at a wireless communication device, at least first and second network domain identifiers, each of the network domain identifiers being associated with a respective network service, the network domain identifiers having a first number of bits. The method further includes transmitting, to a first access point, an access request message for establishing the network service associated with at least one of the network domain identifiers, the access request message including a third network domain identifier associated with a plurality of network services, the third network domain identifier including a sequence of bits based on the first or second identifier, the bit length of the sequence of bits being less than the first number of bits an access request message for establishing the network service associated with at least one of the transmitted network domain identifiers. The method includes receiving, from a second access point, a broadcast access response message establishing the network service and including the second network domain identifier, the second network domain identifier including the third network domain identifier combined with an additional identifier.

Another aspect of the subject matter described in the disclosure provides another apparatus configured to reduce signaling during link setup in a wireless communication system. The apparatus includes a receiver configured to receive at least first and second network domain identifiers, each of the network domain identifiers being associated with a respective network service, the network domain identifiers having a first number of bits. The apparatus further includes a transmitter configured to transmit, to a first access point, an access request message for establishing the network service associated with at least one of the network domain identifiers, the access request message including a third network domain identifier associated with a plurality of network services, the third network domain identifier including a sequence of bits based on the first or second identifier, the bit length of the sequence of bits being less than the first number of bits an access request message for establishing the network service associated with at least one of the transmitted network domain identifiers. The receiver is further configured to receive, from a second access point, a broadcast access response message establishing the network service and including the second network domain identifier, the second network domain identifier including the third network domain identifier combined with an additional identifier.

Another aspect of the subject matter described in the disclosure provides another apparatus for reducing signaling during link setup in a wireless communication system. The apparatus includes means for receiving, at a wireless communication device, at least first and second network domain identifiers, each of the network domain identifiers being associated with a respective network service, the network domain identifiers having a first number of bits. The apparatus further includes means for transmitting, to a first access point, an access request message for establishing the network service associated with at least one of the network domain identifiers, the access request message including a third network domain identifier associated with a plurality of network services, the third network domain identifier including a sequence of bits based on the first or second identifier, the bit length of the sequence of bits being less than the first number of bits an access request message for establishing the network service associated with at least one of the transmitted network domain identifiers. The apparatus further includes means for receiving, from a second access point, a broadcast access response message establishing the network service and including the second network domain identifier, the second network domain identifier including the third network domain identifier combined with an additional identifier.

Another aspect of the subject matter described in the disclosure provides another computer-readable storage medium comprising instructions executable by a processor of an apparatus in a wireless communication system. The instructions cause the apparatus to receive, at a wireless communication device, at least first and second network domain identifiers, each of the network domain identifiers being associated with a respective network service, the network domain identifiers having a first number of bits. The medium further includes code that, when executed, causes the apparatus to transmit, to a first access point, an access request message for establishing the network service associated with at least one of the network domain identifiers, the access request message including a third network domain identifier associated with a plurality of network services, the third network domain identifier including a sequence of bits based on the first or second identifier, the bit length of the sequence of bits being less than the first number of bits an access request message for establishing the network service associated with at least one of the transmitted network domain identifiers. The medium further includes code that, when executed, causes the apparatus to receive, from a second access point, a broadcast access response message establishing the network service and including the second network domain identifier, the second network domain identifier including the third network domain identifier combined with an additional identifier.

Another aspect of the subject matter described in the disclosure provides another method of reducing signaling during link setup in a wireless communication system. The method includes transmitting two or more network domain identifiers from an access point, each of the network domain identifiers being associated with a respective network service. The method further includes receiving an access request message for establishing the network service associated with at least one of the transmitted network domain identifiers.

Another aspect of the subject matter described in the disclosure provides a device configured to reduce signaling during link setup in a wireless communication system. The device includes a transmitter configured to transmit two or more network domain identifiers from an access point, each of the network domain identifiers being associated with a respective network service. The device further includes a receiver configured to receive an access request message for establishing the network service associated with at least one of the transmitted network domain identifiers.

Another aspect of the subject matter described in the disclosure provides another computer-readable storage medium comprising instructions executable by a processor of an apparatus in a wireless communication system. The instructions cause the apparatus to transmit two or more network domain identifiers from an access point, each of the network domain identifiers being associated with a respective network service. The medium further includes code that, when executed, causes the apparatus to receive an access request message for establishing the network service associated with at least one of the transmitted network domain identifiers.

Another aspect of the subject matter described in the disclosure provides another apparatus for reducing signaling during link setup in a wireless communication system. The apparatus includes means for transmitting two or more network domain identifiers from an access point, each of the network domain identifiers being associated with a respective network service. The apparatus further includes means for receiving an access request message for establishing the network service associated with at least one of the transmitted network domain identifiers.

Another aspect of the subject matter described in the disclosure provides another method of reducing signaling during link setup in a wireless communication system. The method includes receiving two or more network domain identifiers from an access point, each of the network domain identifiers being associated with a respective network service. The method further includes transmitting an access request message for establishing the network service associated with at least one of the transmitted network domain identifiers.

Another aspect of the subject matter described in the disclosure provides another device configured to reduce signaling during link setup in a wireless communication system. The device includes a receiver configured to receive two or more network domain identifiers from an access point, each of the network domain identifiers being associated with a respective network service. The device further includes a transmitter configured to transmit an access request message for establishing the network service associated with at least one of the transmitted network domain identifiers.

Another aspect of the subject matter described in the disclosure provides another apparatus for reducing signaling during link setup in a wireless communication system. The apparatus includes means for receiving two or more network domain identifiers from an access point, each of the network domain identifiers being associated with a respective network service. The apparatus further includes means for transmitting an access request message for establishing the network service associated with at least one of the transmitted network domain identifiers.

Another aspect of the subject matter described in the disclosure provides another computer-readable storage medium comprising instructions executable by a processor of an apparatus in a wireless communication system. The instructions cause the apparatus to receive two or more network domain identifiers from an access point, each of the network domain identifiers being associated with a respective network service. The medium further includes code that, when executed, causes the apparatus to transmit an access request message for establishing the network service associated with at least one of the transmitted network domain identifiers.

Another aspect of the subject matter described in the disclosure provides another method of reducing signaling during link setup in a wireless communication system. The method includes queuing for transmission, at a first device, a first message for requesting information to establish a link with an access point, the first message including a network identifier for the access point. The method further includes, before transmission of the message, receiving a second message including the information. The method further includes removing the message from the queue when the second message includes the information.

Another aspect of the subject matter described in the disclosure provides another device configured to reduce signaling during link setup in a wireless communication system. The device includes a queue configured to store a message for requesting information to establish a link with an access point, the first message including a network identifier for the access point. The device further includes a receiver configured to, before transmission of the first message, receive another message including the information. The device further includes a processor configured to remove the first message from the queue when the second message includes the information.

Another aspect of the subject matter described in the disclosure provides another apparatus for reducing signaling during link setup in a wireless communication system. The apparatus includes means for queuing a message for requesting information to establish a link with an access point, the first message including a network identifier for the access point. The apparatus further includes means for receiving, before transmission of the first message, another message including the first information. The apparatus further includes means for removing the first message from the queue when the second message includes the information.

Another aspect of the subject matter described in the disclosure provides another computer-readable storage medium comprising instructions executable by a processor of an apparatus in a wireless communication system. The instructions cause the apparatus to queue for transmission a message for requesting information to establish a link with an access point, the first message including a network identifier for the access point. The medium further includes code that, when executed, causes the apparatus to receive, before transmission of the first message, another message including the first information. The medium further includes code that, when executed, causes the apparatus to remove the first message from the queue when the second message includes the information.

Another aspect of the subject matter described in the disclosure provides another method of reducing signaling during link setup in a wireless communication system. The method includes transmitting a message advertising wireless communication from an access point. The method further includes receiving a plurality of access requests from a plurality of devices. The method further includes determining demand for wireless communication based on the plurality of access requests. The method further includes modifying a broadcast of the message advertising the wireless communication based on the determined demand.

Another aspect of the subject matter described in the disclosure provides another device configured to reduce signaling during link setup in a wireless communication system. The device includes a transmitter configured to transmit a message advertising wireless communication. The device further includes a receiver configured to receive a plurality of access requests for the wireless communication from a plurality of devices. The device further includes a processor configured to determine demand for the wireless communication based on the plurality of access requests. The processor is further configured to modify a broadcast of the message advertising the wireless communication based on the determined demand.

Another aspect of the subject matter described in the disclosure provides another apparatus for reducing signaling during link setup in a wireless communication system. The apparatus includes means for transmitting a message advertising wireless communication. The apparatus further includes means for receiving a plurality of access requests for the wireless communication from a plurality of devices. The apparatus further includes means for determining demand for the wireless communication based on the plurality of access requests. The apparatus further includes means for modifying a broadcast of the message advertising the wireless communication based on the determined demand.

Another aspect of the subject matter described in the disclosure provides another computer-readable storage medium comprising instructions executable by a processor of a device in a wireless communication system. The instructions cause the device to transmit a message advertising wireless communication. The medium further includes code that, when executed, causes the apparatus to receive a plurality of access requests for the wireless communication from a plurality of devices. The medium further includes code that, when executed, causes the apparatus to determine demand for the wireless communication. The medium further includes code that, when executed, causes the apparatus to modify the broadcast of the message advertising the wireless communication based in part on the determined demand.

Another aspect of the subject matter described in the disclosure provides another method of reducing signaling during link setup in a wireless communication system. The method includes receiving, at a device, at least two different access request messages each for establishing a link with the device. The method further includes determining a period of time for transmitting access response messages in response to the received access request messages. The method further includes reserving a period of transmission time on a channel for transmitting the access response messages for establishing the link, the reservation based at least in part on the determined period of time. The method further includes transmitting the access response messages during the reserved period of time.

Another aspect of the subject matter described in the disclosure provides another apparatus configured to reduce signaling during link setup in a wireless communication. The apparatus includes a receiver configured to receive at least two different access request messages each for establishing a link with the apparatus. The apparatus further includes a processor configured to determine a period of time for transmitting access response messages, the processor further configured to reserve a period of time on a channel for transmitting the access response messages to establish the link, the reservation based at least in part on the determined period of time. The apparatus further includes a transmitter configured to transmit the access response messages during the reserved period of time.

Another aspect of the subject matter described in the disclosure provides another apparatus for reducing signaling during link setup in a wireless communication, the apparatus includes means for receiving at least two different access request messages each for establishing a link with the apparatus. The apparatus further includes means for determining a period of time for transmitting access response messages in response to the received access request messages. The apparatus further includes means for reserving a period of transmission time on a channel for transmitting the access response messages establish the link, the reservation based at least in part on the determined period of time. The apparatus further includes means for transmitting the access response messages during the reserved period of time.

Another aspect of the subject matter described in the disclosure provides another computer-readable storage medium comprising instructions executable by a processor of an apparatus in a wireless communication system. The instructions cause the apparatus to receive at least two different access request messages each for establishing a link with the apparatus. The medium further includes code that, when executed, causes the apparatus to determine a period of time for transmitting access response messages in response to the received access request messages. The medium further includes code that, when executed, causes the apparatus to reserve a period of transmission time on a channel for transmitting the access response messages to establish the link, the reservation based at least in part on the determined period of time. The medium further includes code that, when executed, causes the apparatus to transmit the access response messages during the reserved period of time.

Another aspect of the subject matter described in the disclosure provides another method of reducing signaling in a wireless communication system. The method includes providing a network service configured to communicate via a plurality of channels. The method further includes determining a characteristic of the network service comprising a load value for each of the plurality of channels. The method further includes transmitting an identifier of the characteristic of the network service for obtaining the network service in the wireless communication system.

Another aspect of the subject matter described in the disclosure provides another device configured to reduce signaling in a wireless communication system. The device includes a network service configured to communicate via a plurality of channels. The device further includes a service monitor configured to determine a characteristic of the network service comprising a load value for each of the plurality of channels. The device further includes a transmitter configured to transmit an identifier of the characteristic of the network service for obtaining the network service in the wireless communication system.

Another aspect of the subject matter described in the disclosure provides another apparatus for reducing signaling in a wireless communication system. The apparatus includes means for providing a network service configured to communicate via a plurality of channels. The apparatus further includes means for determining a characteristic of the network service comprising a load value for each of the plurality of channels. The apparatus further includes means for transmitting an identifier of the characteristic of the network service for obtaining the network service in the wireless communication system.

Another aspect of the subject matter described in the disclosure provides another computer-readable storage medium comprising instructions executable by a processor of an apparatus in a wireless communication system. The instructions cause the apparatus to provide a network service configured to communicate via a plurality of channels. The medium further includes code that, when executed, causes the apparatus to determine a characteristic of the network service comprising a load value for each of the plurality of channels. The medium further includes code that, when executed, causes the apparatus to transmit an identifier of the characteristic of the network service for obtaining the network service in the wireless communication system.

Another aspect of the subject matter described in the disclosure provides another method of reducing signaling in a wireless communication system. The method includes receiving, at a wireless communication device from a network service provider, an identifier of a characteristic for each of one or more network services for obtaining the network service in the wireless communication system. The method further includes selecting, at the wireless communication device, a network service of the one or more network services to associate with based on the received characteristics. The method further includes transmitting, from the wireless communication device to a provider of the selected network service, a message to associate with the selected network service.

Another aspect of the subject matter described in the disclosure provides another device configured to reduce signaling in a wireless communication system. The device includes a receiver configured to receive, from a network service provider, an identifier of a characteristic for each of one or more network services for obtaining the network service in the wireless communication system. The device further includes a service selection circuit configured to select a network service of the one or more network services to associate with based on the received characteristics. The device further includes a transmitter configured to transmit, from the device to a provider of the selected network service, a message to associate with the selected network service.

Another aspect of the subject matter described in the disclosure provides another apparatus for reducing signaling during link setup in a wireless communication system. The apparatus includes means for receiving, from a network service provider, an identifier of a characteristic for each of one or more network services for obtaining the network service in the wireless communication system. The apparatus further includes means for selecting a network service of the one or more network services to associate with based on the received characteristics. The apparatus further includes means for transmitting, from the device to a provider of the selected network service, a message to associate with the selected network service.

Another aspect of the subject matter described in the disclosure provides another computer-readable storage medium comprising instructions executable by a processor of a device in a wireless communication system. The instructions cause the device to receive, from a network service provider, an identifier of a characteristic for each of one or more network services for obtaining the network service in the wireless communication system. The medium further includes code that, when executed, causes the apparatus to select a network service of the one or more network services to associate with based on the received characteristics. The medium further includes code that, when executed, causes the apparatus to transmit, from the device to a provider of the selected network service, a message to associate with the selected network service.

Another aspect of the subject matter described in the disclosure provides another method of reducing signaling during link setup in a wireless communication system. The method includes assigning a first identifier at a first access point, the first identifier for establishing a link with the first access point and having a first number of bits. The method further includes receiving from a device an access request message to establish the link, the access request message including a second identifier associated with a plurality of access points configured to provide the link, the plurality of access points including the first access point, the second identifier including a sequence of bits having a bit length, wherein the sequence of bits is based on the first identifier, and wherein the bit length of the sequence of bits is less than the first number of bits. The method further includes transmitting an access response message establishing the link with the device and including the first identifier.

Another aspect of the subject matter described in the disclosure provides another apparatus configured to reduce signaling during link setup in a wireless communication system. The apparatus includes a memory configured to store a first identifier for the apparatus, the first identifier for establishing a link with the apparatus and having a first number of bits. The apparatus further includes a receiver configured to receive from a device an access request message to establish the link, the access request message including a second identifier associated with a plurality of access points configured to provide the link, the plurality of access points including the apparatus, the second identifier including a sequence of bits having a bit length, wherein the sequence of bits is based on the first identifier, and wherein the bit length of the sequence of bits is less than the first number of bits. The apparatus further includes a transmitter configured to transmit an access response message establishing the link with the device and including the first identifier.

Another aspect of the subject matter described in the disclosure provides another apparatus for reducing signaling during link setup in a wireless communication system. The apparatus includes means for storing a first identifier for the apparatus, the first identifier for establishing a link with the apparatus and having a first number of bits. The apparatus further includes means for receiving from a device an access request message to establish the link, the access request message including a second identifier associated with a plurality of access points configured to provide the link, the plurality of access points including the apparatus, the second identifier including a sequence of bits having a bit length, wherein the sequence of bits is based on the first identifier, and wherein the bit length of the sequence of bits is less than the first number of bits. The apparatus further includes means for transmitting an access response message establishing the link with the device and including the first identifier.

Another aspect of the subject matter described in the disclosure provides another computer-readable storage medium comprising instructions executable by a processor of an apparatus in a wireless communication system. The instructions cause the apparatus to store a first identifier for the apparatus, the first identifier for establishing a link with the apparatus and having a first number of bits. The medium further includes code that, when executed, causes the apparatus to receive from a device an access request message to establish the link, the access request message including a second identifier associated with a plurality of access points configured to provide the link, the plurality of access points including the apparatus, the second identifier including a sequence of bits having a bit length, wherein the sequence of bits is based on the first identifier, and wherein the bit length of the sequence of bits is less than the first number of bits. The medium further includes code that, when executed, causes the apparatus to transmit an access response message establishing the link with the device and including the first identifier.

Another aspect of the subject matter described in the disclosure provides another method of reducing signaling during link setup in a wireless communication system. The method includes assigning a first identifier to a first access point, the first identifier for establishing a link with the first access point and having a first number of bits. The method further includes transmitting an access request message to one or more access points configured to provide the link, the access request message including the first identifier. The method further includes receiving from a second access point of the one or more access points an access response message establishing the link and including a second identifier associated with the second access point, the second identifier including the first identifier combined with an additional identifier.

Another aspect of the subject matter described in the disclosure provides another device configured to reduce signaling during link setup in a wireless communication system. The device includes a memory configured to store a first identifier for establishing a link with a first access point and having a first number of bits. The device further includes a transmitter configured to transmit an access request message to one or more access points configured to provide the link, the access request message including the first identifier. The device further includes a receiver configured to receive from a second access point of the one or more access points an access response message establishing the link and including a second identifier associated with the second access point, the second identifier including the first identifier combined with an additional identifier.

Another aspect of the subject matter described in the disclosure provides another apparatus for reducing signaling during link setup in a wireless communication system. The apparatus includes means for storing a first identifier for the apparatus, the first identifier for establishing a link with the apparatus and having a first number of bits. The apparatus further includes means for transmitting an access request message to one or more access points configured to provide the link, the access request message including the first identifier. The apparatus further includes means for receiving from a second access point of the one or more access points an access response message establishing the link and including a second identifier associated with the first access point, the second identifier including the first identifier combined with an additional identifier.

Another aspect of the subject matter described in the disclosure provides another computer-readable storage medium comprising instructions executable by a processor of an apparatus. The instructions cause the apparatus to store a first identifier for the apparatus, the first identifier for establishing a link with the apparatus and having a first number of bits. The medium further includes code that, when executed, causes the apparatus to transmit an access request message to one or more access points configured to provide the link, the access request message including the first identifier. The medium further includes code that, when executed, causes the apparatus to receive from a second access point of the one or more access points an access response message establishing the link and including a second identifier associated with the first access point, the second identifier including the first identifier combined with an additional identifier.

Another aspect of the subject matter described in the disclosure provides another method of reducing signaling during link setup in a wireless communication system. The method includes receiving, at a wireless communication device from a network service provider, a first message indicating a characteristic for each of one or more network services for obtaining the network service in the wireless communication system. The method further includes selecting, at the wireless communication device, a network service of the one or more network services to associate with based on the characteristics. The method further includes queuing for transmission, at the wireless communication device, a first message for requesting information to obtain the network service. The method further includes before transmission of the message, receiving a second message comprising the information. The method further includes removing the message from the queue when the second message comprises the information.

Another aspect of the subject matter described in the disclosure provides another wireless communication device configured to reduce signaling during link setup in a wireless communication system. The device includes a receiver configured to receive, from a network service provider, a first message indicating a characteristic for each of one or more network services for obtaining the network service in the wireless communication system. The device further includes one or more processors configured to select a network service of the one or more network services to associate with based on the characteristics. The processor is further configured to queue for transmission a first message for requesting information to obtain the network service. The processor is further configured to, before transmission of the message, receive a second message comprising the information. The processor is further configured to remove the message from the queue when the second message comprises the information.

Another aspect of the subject matter described in the disclosure provides another apparatus for reducing signaling during link setup in a wireless communication system. The apparatus includes means for receiving, at a wireless communication device from a network service provider, a first message indicating a characteristic for each of one or more network services for obtaining the network service in the wireless communication system. The apparatus further includes means for selecting, at the wireless communication device, a network service of the one or more network services to associate with based on the characteristics. The apparatus further includes means for queuing for transmission, at the wireless communication device, a first message for requesting information to obtain the network service. The apparatus further includes means for receiving a second message comprising the information, before transmission of the message. The apparatus further includes means for removing the message from the queue when the second message comprises the information.

Another aspect of the subject matter described in the disclosure provides another computer-readable storage medium comprising instructions executable by a processor of an apparatus in a wireless communication system. The instructions cause the apparatus to receive, at a wireless communication device from a network service provider, a first message indicating a characteristic for each of one or more network services for obtaining the network service in the wireless communication system. The medium further includes code that, when executed, causes the apparatus to select, at the wireless communication device, a network service of the one or more network services to associate with based on the characteristics. The medium further includes code that, when executed, causes the apparatus to queue for transmission, at the wireless communication device, a first message for requesting information to obtain the network service. The medium further includes code that, when executed, causes the apparatus to, before transmission of the message, receive a second message comprising the information, The medium further includes code that, when executed, causes the apparatus to remove the message from the queue when the second message comprises the information.

Another aspect of the subject matter described in the disclosure provides another method of reducing signaling in a wireless communication system. The method includes providing, at an access point, a network service configured to communicate via a plurality of channels. The method further includes determining, at the access point, a characteristic of the network service comprising a load value for each of the plurality of channels. The method further includes transmitting, from the access point, a message advertising the network service and indicating the characteristic of the network service. The method further includes receiving, at the access point, a plurality of access requests from a plurality of devices. The method further includes determining demand for wireless communication based on the plurality of access requests. The method further includes modifying a broadcast of the message advertising the network service based on the determined demand.

Another aspect of the subject matter described in the disclosure provides an access point configured to communicate via a plurality of channels. The access point includes a processor configured to determine a characteristic of the network service comprising a load value for each of the plurality of channels. The access point further includes a transmitter configured to transmit a message advertising the network service and indicating the characteristic of the network service. The access point further includes a receiver configured to receive a plurality of access requests from a plurality of devices. The processor is further configured to determine demand for wireless communication based on the plurality of access requests. The processor is further configured to modify a broadcast of the message advertising the network service based on the determined demand.

Another aspect of the subject matter described in the disclosure provides another apparatus for reducing signaling during link setup in a wireless communication system. The apparatus includes means for providing, at an access point, a network service configured to communicate via a plurality of channels. The apparatus further includes means for determining, at the access point, a characteristic of the network service comprising a load value for each of the plurality of channels. The apparatus further includes means for transmitting, from the access point, a message advertising the network service and indicating the characteristic of the network services. The apparatus further includes means for receiving, at the access point, a plurality of access requests from a plurality of devices. The apparatus further includes means for determining demand for wireless communication based on the plurality of access requests. The apparatus further includes means for modifying a broadcast of the message advertising the network service based on the determined demand.

Another aspect of the subject matter described in the disclosure provides another computer-readable storage medium comprising instructions executable by a processor of an apparatus in a wireless communication system. The instructions cause the apparatus to provide, at an access point, a network service configured to communicate via a plurality of channels. The medium further includes code that, when executed, causes the apparatus to determine, at the access point, a characteristic of the network service comprising a load value for each of the plurality of channels. The medium further includes code that, when executed, causes the apparatus to transmit, from the access point, a message advertising the network service and indicating the characteristic of the network service. The medium further includes code that, when executed, causes the apparatus to receive, at the access point, a plurality of access requests from a plurality of devices. The medium further includes code that, when executed, causes the apparatus to determine demand for wireless communication based on the plurality of access requests. The medium further includes code that, when executed, causes the apparatus to modify a broadcast of the message advertising the network service based on the determined demand.

Another aspect of the subject matter described in the disclosure provides another method of reducing signaling during link setup in a wireless communication system. The method includes receiving, at a terminal, a message including information for establishing a link with a device in the wireless communication system. The method further includes identifying, at the terminal, a time slot and a back-off amount within the identified time slot based on a value included in the received message. The method further includes abstaining from sensing a medium based on the identified time slot and the identified back-off amount. The method further includes transmitting an association request message to establish the link with the device during the identified time slot after expiration of the back-off amount.

Another aspect of the subject matter described in the disclosure provides another apparatus configured to reduce signaling during link setup in a wireless communication system. The apparatus includes a receiver configured to receive a message including information for establishing a link with a device in the wireless communication system. The apparatus further includes a processor configured to identify a time slot and a back-off amount within the identified time slot based on a value included in the received message. The processor is further configured to abstain from sensing a medium based on the identified time slot and the identified back-off amount. The apparatus further includes a transmitter configured to transmit an association request message to establish the link with the device during the time slot after expiration of the back-off amount.

Another aspect of the subject matter described in the disclosure provides another apparatus for reducing signaling during link setup in a wireless communication system. The apparatus includes means for receiving a message including information for establishing a link with a device in the wireless communication system. The apparatus further includes means for identifying a time slot and a back-off amount based on a value included in the received message. The apparatus further includes means for establishing the link with the device, the means configured to abstain from sensing a medium based on the identified time slot and the identified back-off amount. The processor is further configured to transmit an association request message to establish the link with the device during the identified time slot after expiration of the back-off amount.

Another aspect of the subject matter described in the disclosure provides another computer-readable storage medium comprising instructions executable by a processor of an apparatus in a wireless communication system. The instructions cause the apparatus to receive a message including information for establishing a link with a device in the wireless communication system. The medium further includes code that, when executed, causes the apparatus to identify a time slot and a back-off amount within the identified time slot based on a value included in the received message. The medium further includes code that, when executed, causes the apparatus to abstain from sensing a medium based on the identified time slot and the identified back-off amount. The medium further includes code that, when executed, causes the apparatus to transmit an association request message to establish the link with the device during the identified time slot after expiration of the back-off amount.

Another aspect of the subject matter described in the disclosure provides another method of reducing signaling during link setup in a wireless communication system. The method includes generating, at a device, a value identifying a time period for a plurality of terminals to transmit association request messages, the association request messages requesting a link with the device. The method further includes transmitting a message including the value to the terminals. The method further includes receiving, during the identified time period, an association request message for establishing the link from one of the terminals.

Another aspect of the subject matter described in the disclosure provides another device configured to reduce signaling during link setup in a wireless communication system. The device includes a processor configured to generate a value identifying a time period for a plurality of terminals to transmit association request messages to the device, the association request messages for establishing a link with the device. The device further includes a transmitter configured to transmit a message including the value to the terminals. The device further includes a receiver configured to receive, during the identified time period, an association request message for establishing the link from one of the terminals.

Another aspect of the subject matter described in the disclosure provides another device for reducing signaling during link setup in a wireless communication system. The device includes means for generating a value identifying a time period for terminals to transmit association request messages to establish a link with the device. The device further includes means for transmitting a message including the value to the terminals. The device further includes means for receiving, during the identified time period, an association request message for establishing the link from a terminal to establish the link between the device and the terminal.

Another aspect of the subject matter described in the disclosure provides another computer-readable storage medium comprising instructions executable by a processor of a device in a wireless communication system. The instructions cause the device to generate a value identifying a time period for terminals to transmitting association request messages to establish a link with the wireless communication system via the device. The medium further includes code that, when executed, causes the apparatus to transmit a message including the value to the terminals. The medium further includes code that, when executed, causes the apparatus to receive, during the identified time period, an association request message for establishing the link from a terminal to establish the link between the device and the terminal.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention can be practiced without these specific details. In some instances, well-known structures and devices are shown in block diagram form in order to avoid obscuring the novelty of the exemplary embodiments presented herein.

Figure 1:
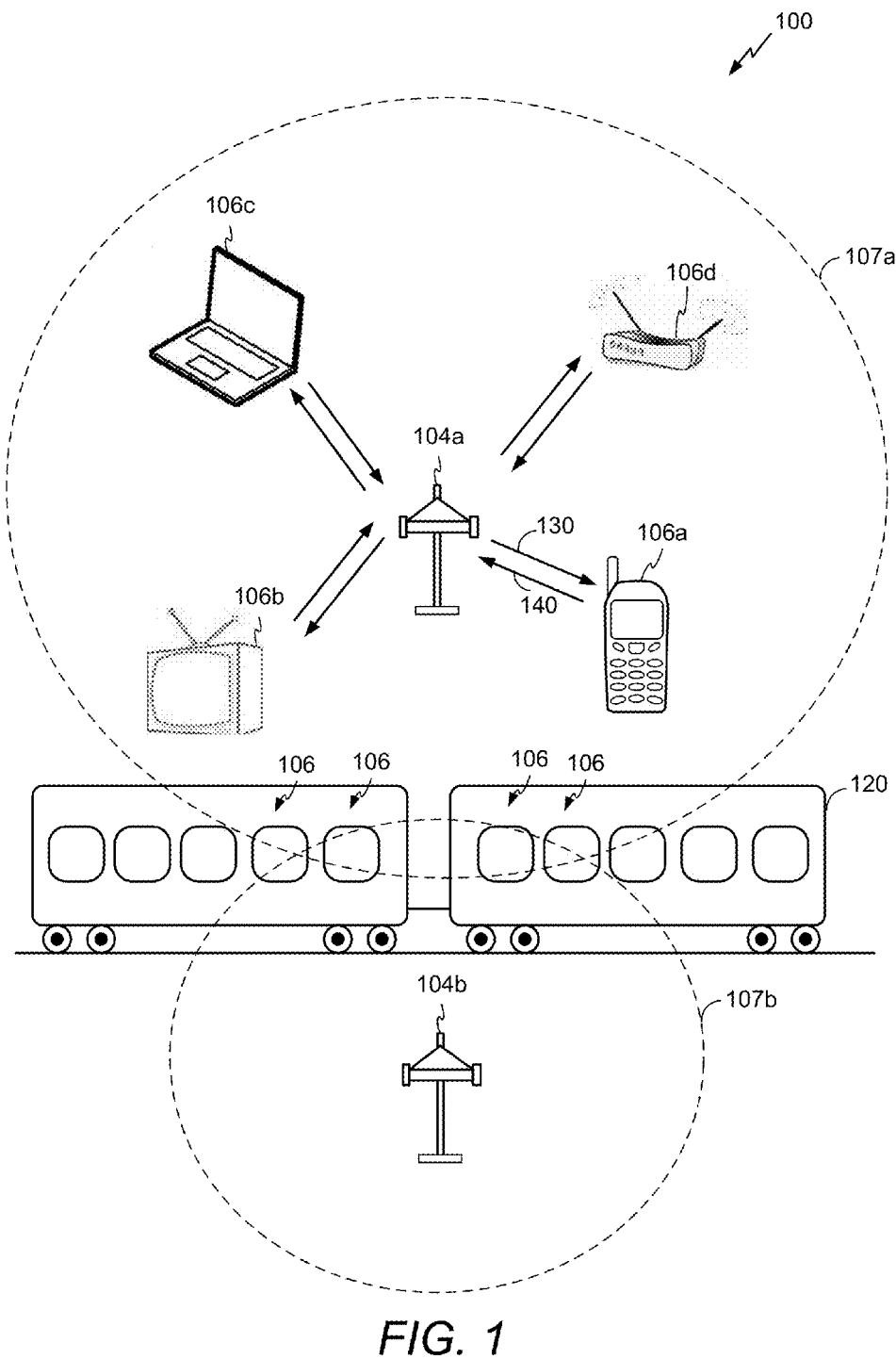
FIG. 1 shows an exemplary wireless communication system in which aspects of the present disclosure can be employed.

FIG. 1 shows an exemplary wireless communication system 100 in which aspects of the present disclosure can be employed. The wireless communication system 100 includes an access point (AP) 104a, which communicates with a plurality of stations (STAs) 106a-106d in a basic service area (BSA) 107a. The wireless communication system 100 can further include a second AP 104b which can communicate in a BSA 107b. One or more STAs 106 can move in and/or out of the BSAs 107a-107b, for example, via a train 120. In various embodiments described herein, the STAs 106 and 106a-106d can be configured to quickly establish wireless links with the AP 104a and/or 104b, particularly when moving into the BSAs 107a and/or 107b.

The various fast initial link setup ("FILS") implementations described herein can provide enhanced system performance under a variety of use conditions. In some embodiments, when a large number of STAs 106 move into range of an AP 104a and/or 104b, they can create a large amount of wireless traffic, for example, in an attempt to establish a wireless link with the AP 104a. In some instances, the STAs 106 can generate hundreds of connection attempts per second. A high number of STAs 106 requesting access can cause packet collisions and/or dropping of packets, thereby potentially reducing network performance. As another example, the STAs 106 may only be within range of an AP 104a and/or 104b for a short amount of time. For example, the train 120 may enter and exit the BSA 107a in a matter of seconds, or even milliseconds. Accordingly, a faster initial link setup can provide network connectivity for a greater amount of time, and can reduce latency. As described in greater detail herein, the devices 106 and 104a-106b can implement various techniques to reduce signaling, and thereby enhance network performance.

In various embodiments, the wireless communication system 100 can include a wireless local area network (WLAN). The WLAN can be used to interconnect nearby devices, employing one or more networking protocols. The various aspects described herein can apply to any communication standard, such as IEEE 802.11 wireless protocols. For example, the various aspects described herein can be used as part of the IEEE 802.11a, 802.11b, 802.11g, 802.11n, and/or 802.11ah protocols. Implementations of the 802.11 protocols can be used for sensors, home automation, personal healthcare networks, surveillance networks, metering, smart grid networks, intra- and inter-vehicle communication, emergency coordination networks, cellular (e.g., 3 G/4 G) network offload, short- and/or long-range Internet access, machine-to-machine (M2M) communications, etc.

The APs 104a-104b can serve as a hub or base station for the wireless communication system 100. For example, the AP 104a can provide wireless communication coverage in the BSA 107a, and the AP 104b can provide wireless communication coverage in the BSA 107b. The AP 104a and/or 104b can include, be implemented as, or known as a NodeB, Radio Network Controller (RNC), eNodeB, Base Station Controller (BSC), Base Transceiver Station (BTS), Base Station ("BS"), Transceiver Function (TF), Radio Router, Radio Transceiver, or some other terminology.

The STAs 106 and 106a-106d (collectively referred to herein as STAs 106) can include a variety of devices such as, for example, laptop computers, personal digital assistants (PDAs), mobile phones, etc. The STAs 106 can connect to, or associate with, the APs 104a-104b via a WiFi (e.g., IEEE 802.11 protocol such as 802.11ah) compliant wireless link to obtain general connectivity to the Internet or to other wide area networks.

In various embodiments, the STAs 106 can include, be implemented as, or be known as access terminals (ATs), subscriber stations, subscriber units, mobile stations, remote stations, remote terminals, user terminals (UTs), terminals, user agents, user devices, user equipment (UEs), or some other terminology. In some implementations, a STA 106 can include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The AP 104a, along with the STAs 106a-106d associated with the AP 104a, and that are configured to use the AP 104a for communication, can be referred to as a basic service set (BSS). In some embodiments, the wireless communication system 100 may not have a central AP 104a. For example, in some embodiments, the wireless communication system 100 can function as a peer-to-peer network between the STAs 106. Accordingly, the functions of the AP 104a described herein can alternatively be performed by one or more of the STAs 106. Moreover the AP 104a can implement one or more aspects described with respect to the STAs 106, in some embodiments.

A communication link that facilitates transmission from the AP 104a to one or more of the STAs 106 can be referred to as a downlink (DL) 130, and a communication link that facilitates transmission from one or more of the STAs 106 to the AP 104a can be referred to as an uplink (UL) 140. Alternatively, a downlink 130 can be referred to as a forward link or a forward channel, and an uplink 140 can be referred to as a reverse link or a reverse channel.

A variety of processes and methods can be used for transmissions in the wireless communication system 100 between the AP 104a and the STAs 106. In some aspects, wireless signals can be transmitted using orthogonal frequency-division multiplexing (OFDM), direct-sequence spread spectrum (DSSS) communications, a combination of OFDM and DSSS communications, or other schemes. For example, signals can be sent and received between the AP 104a and the STAs 106 in accordance with OFDM/OFDMA processes. Accordingly, the wireless communication system 100 can be referred to as an OFDM/OFDMA system. As another example, signals can be sent and received between the AP 104a and the STAs 106 in accordance with CDMA processes. Accordingly, the wireless communication system 100 can be referred to as a CDMA system.

Aspects of certain devices (such as the AP 104a and the STAs 106) implementing such protocols can consume less power than devices implementing other wireless protocols. The devices can be used to transmit wireless signals across a relatively long range, for example about one kilometer or longer. As described in greater detail herein, in some embodiments, devices can be configured to establish wireless links faster than devices implementing other wireless protocols.

Figure 2:
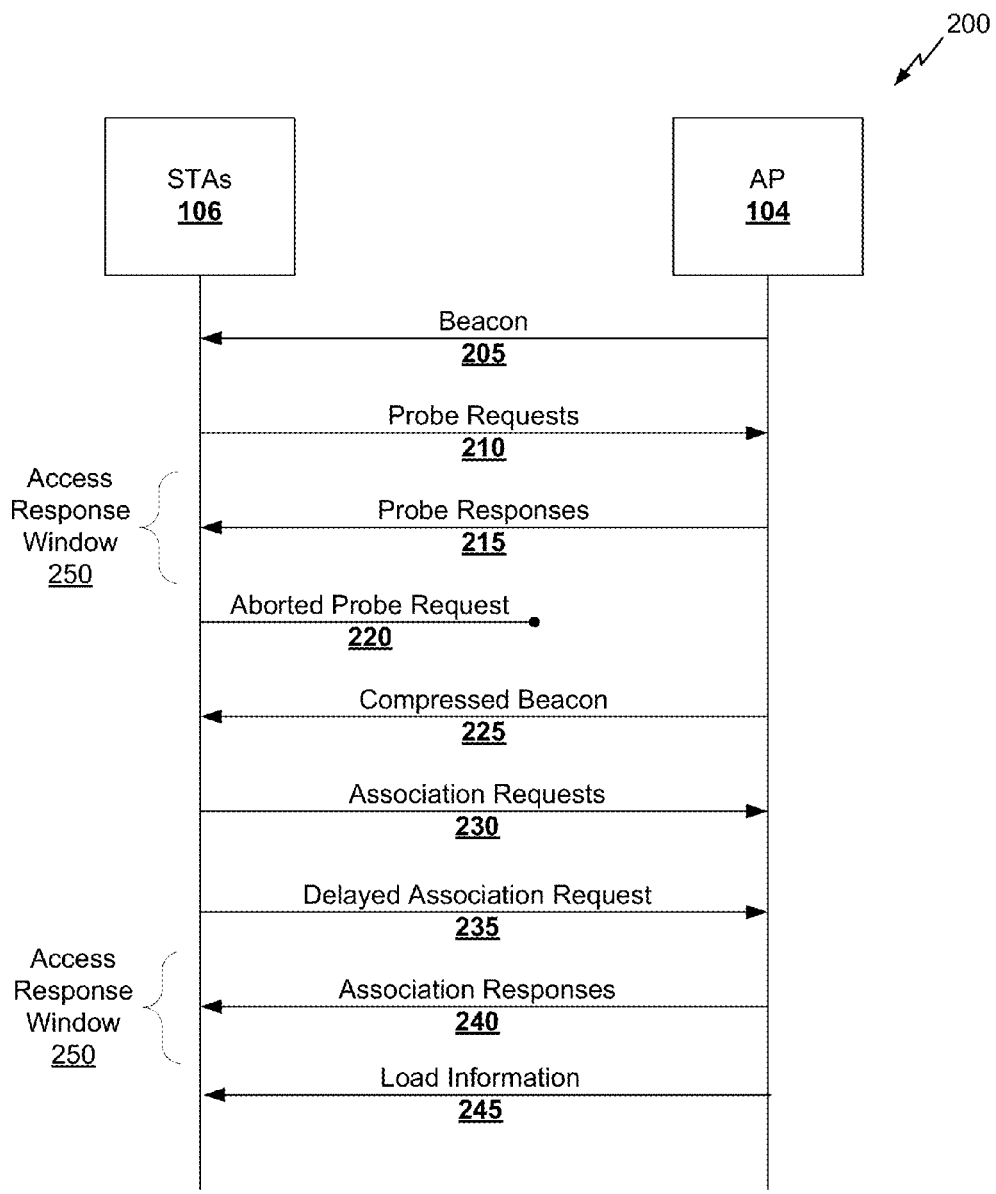
FIG. 2 shows an exemplary communication exchange in the wireless communication system of FIG. 1.

FIG. 2 shows an exemplary communication exchange 200 in the wireless communication system 100 of FIG. 1. Signaling is shown, according to various embodiments, between one or more STAs 106 and an AP 104 during association. The STAs 106 shown in FIG. 2 can include one or more of the STAs 106 and 106a-106d, described above with respect to FIG. 1. Likewise, the AP 104 can include one or more of the APs 104a-104b, described above with respect to FIG. 1.

Although specific details can vary according to various embodiments, which are described below, the AP 104 will generally broadcast a beacon 205, advertising a wireless network managed by the AP 104. The AP 104 can periodically transmit the beacon 205, which can include information on how the STAs 106 can communicate with the AP 104, and the capabilities of the AP 104. In some embodiments, the AP 104 can be configured to transmit the beacon 205 at a beacon interval of, for example, 100 ms. Accordingly, in cases where the STAs 106 are moving rapidly, a significant portion of the time during which the STAs 106 are in range of the AP 104 could be spent waiting for the beacon 205. For example, where the STAs 106 are on the train 120 (FIG. 1), the STAs 106 might be in range of the AP 104 for less than one second.

The STAs 106 can also request information about the wireless network managed by the AP 104 by transmitting probe requests 210. The STAs 106 can transmit one or more probe requests 210, for example, when they have not yet seen a beacon 205, to obtain additional information about the AP 104, and/or to determine which APs are in range. In various embodiments described herein, the probe requests 210 can be referred to generally as access requests.

The AP 104 can respond to one or more probe requests 210 with one or more probe responses 215. The probe responses 215 can include, for example, information on how the STAs 106 can communicate with the AP 104, and the capabilities of the AP 104. In various embodiments described herein, the probe responses 215 can be referred to generally as access responses.

Because, in some embodiments, the STAs 106 can request and receive probe responses 215 more often than they receive intermittent beacons 205, the STAs 106 can learn about the AP 104 quicker. Accordingly, wireless link setup time and latency can be reduced. In some cases, however, there may be a large number of probe requests 210. For example, where a large number of STAs 106 come within range of the AP 104, the AP 104 may receive hundreds of probe requests 210 per second. In some embodiments, the AP 104 can transmit a probe response 215 in response to each probe request 210. Accordingly, the wireless medium can become congested, ultimately increasing link setup time and latency, and decreasing network performance.

Dynamic Probe Response

In some embodiments, the AP 104 can be configured to detect increased probe request 210 traffic, and to anticipatorily transmit probe responses 215 with increased frequency. For example, the AP 104 can monitor one or more properties of the probe requests 210, such as a number of requests 210, a rate of requests 210, signal strengths associated with the probe requests 210, etc. When the monitored probe requests 210 surpass a threshold, the AP 104 can begin broadcasting probe responses 215, instead of individually responding to each probe request 210. Accordingly, as an increase in demand for network access is detected, the AP 104 can transition from unicasting probe responses 215 to broadcasting probe responses 215. As the AP 104 detects further increases in the number of probe requests 210, the AP 104 can increase the rate at which it broadcasts the probe responses 215.

The STAs 106 can receive the broadcast probe responses 215, regardless of whether they have transmitted a probe request 220. Accordingly, some STAs 106 may refrain from transmitting a probe request 210 because they have already received information about the AP 104 from a broadcast probe response 215. In some embodiments, a STA 106 can queue a probe request 220 for transmission. If the STA 106 detects a broadcast probe response 215 prior to transmission of the probe request 220, the STA 106 can abort the probe request 220, for example, by removing the probe request 220 from a transmission queue. In some embodiments, the STAs 106 can dequeue probe requests 220 as described below in greater detail with respect to FIG. 14. Accordingly, the STAs 106 can achieve faster link setup by avoiding an additional exchange of probe request 210 and probe response 215.

As the rate of probe requests 210 messages decreases, the AP 104 can switch to a lower broadcast rate for probe responses 215. In some instances, the AP 104 can stop broadcasting probe responses 215, and can return to a unicast mode in which individual probe responses 215 are send directly to individual STAs 106 in response to individual probe requests 210. In various embodiments, the AP 104 can modify probe responses 215 as described below in greater detail with respect to FIG. 8.

Compressed Beacon

In some implementations, the AP 104 can modify the beacon 205 in response to the detected probe request 210 traffic, either instead of, or in addition to, the broadcast probe responses 215 described above. For example, during high traffic periods, the AP 104 can shorten and/or compress the beacon 205, which can reduce transmit time. In various embodiments, the AP 104 can transmit the compressed beacon 225 as described below in greater detail with respect to FIG. 8. The resulting shortened or compressed beacon 225 can also reduce the amount of processing required to decode the signal. Accordingly, the STAs 106 can establish a wireless link with the AP 104 in less time.

Figure 3:
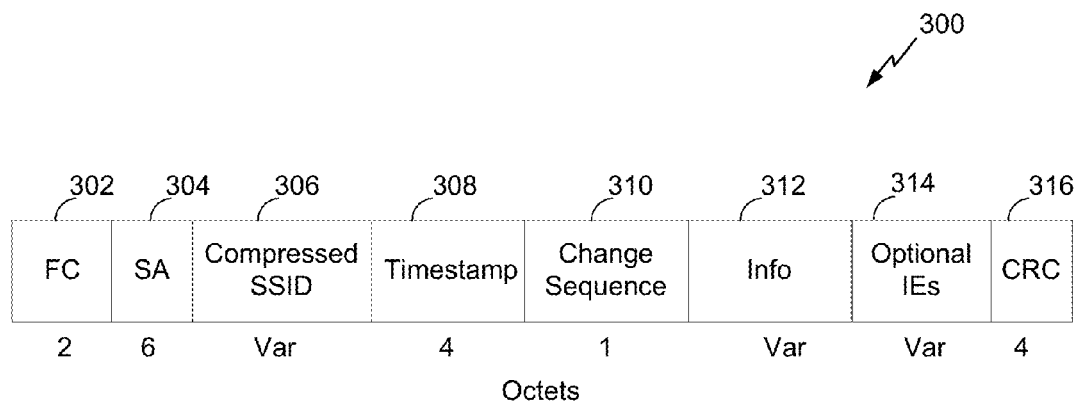
FIG. 3 shows an exemplary compressed beacon that can be employed within the wireless communication system of FIG. 1.

The compressed beacon 225 can have a shorter length than the uncompressed beacon 205. An example of a compressed beacon is shown in FIG. 3 and described in further detail below. In some embodiments, the compressed beacon 225 can include an authentication challenge value (e.g., anonce) for secure association between the AP 104 and the STAs 106. The authentication challenge value can be included in an information element (e.g., an optional information element) of the beacon 225. In some implementations, the STAs 106 can use the compressed beacon 225 to associate with the AP 104 instead of using the probe response 215.

Targeted Probe Requests

In some embodiments, the STAs 106 can be configured to transmit a probe request 210 including a target network identifier. For example, the STAs 106 can transmit a probe request 210 including a network identifier information element (IE), as discussed below with respect to FIG. 4. The network identifier can be, for example, a service set identification (SSID) corresponding to the AP 104. The AP 104 can be configured to respond only to probe requests 210 including the SSID of the AP 104. The AP 104 can refrain from responding to probe requests 210 not including the SSID of the AP 104. Accordingly, the number of probe responses 215 can be reduced, and network performance can be increased.

In some embodiments, the STAs 106 can be configured to transmit a probe request 210 identifying a set of target networks. For example, the probe request 210 can include a shortened SSID including a subset of bits of the SSID of the AP 104. In some embodiments, all the APs 104 of a particular wireless provider can have network identifiers with one or more common bits. For example, the APs 104a-104b (FIG. 1) can have SSIDs starting with the same bits. The common bits can be referred to herein as a "partial SSID." The AP 104 can be configured to respond only to probe requests 210 including the partial SSID of the AP 104. The AP 104 can refrain from responding to probe requests 210 not including the partial SSID of the AP 104. Accordingly, the number of probe responses 215 can be reduced, and network performance can be increased. At the same time, a STAs 106 can receive probe responses 215 from a plurality of targeted APs 104 by sending a single probe request 210.

In some embodiments, the probe request 210 can include a "virtual" identifier that can correspond to one or more related APs. For example, the STAs 106 can address the probe requests 210 to a "virtual" media access control (MAC) address, which may differ from a physical MAC address of the AP 104. The AP 104 can be configured to respond to probe requests 210 addressed to one or more virtual MAC addresses. Likewise, another AP, such as the AP 104a or 104b (FIG. 1) can be configured to respond to probe requests 210 addressed to the same virtual MAC address. Thus, the STAs 106 can receive information about all the APs corresponding to the virtual identifier without broadcasting the probe request 210. Accordingly, the number of probe responses 215 can be reduced, and network performance can be increased.

When the AP 104 responds to a probe request 210 including a shortened, virtual, or partial identifier corresponding to the AP 104, it can include the full SSID and/or the real MAC address in the probe response 215. Because the shortened identifier can be shorter than a full identifier, the STAs 106 can transmit fewer bits, thereby speeding up transmission and reducing link setup time. Moreover, the AP 104 will receive fewer bits, which can increase processing speed. In various embodiments, the STAs 106 can transmit probe requests 210 as described below in greater detail with respect to FIG. 10. The probe The AP 104 can transmit probe responses 215 as described below in greater detail with respect to FIG. 9. One or more messages can include an action management frame as described below in greater detail with respect to FIG. 4.

Association Contention

In general, after the STAs 106 receive information for establishing a link with the AP 104 (for example via a beacon 205, a probe response 215, and/or a compressed beacon 225), the STAs 106 will establish a link, or "associate" with the AP 104. For example, the STAs 106 can send association requests 230 to the AP 104. In various embodiments described herein, the association requests 230 can be referred to generally as access requests. The AP 104 can respond with association responses 240. In various embodiments described herein, the association responses 240 can be referred to generally as access responses.

As with probe requests 210, there may be a large number of association requests 230. For example, where a large number of STAs 106 come within range of the AP 104, the AP 104 may receive hundreds of association requests 230 in a short amount of time. In some embodiments, overlapping association messages can collide, ultimately increasing link setup time and latency, and decreasing network performance.

In some implementations, the STAs 106 can be configured to delay transmission of association requests 235, thereby reducing the rate of collisions. For example, the STAs 106 can be configured to identify a transmission time slot and a backoff amount within the identified time slot. By identifying a time slot during which to transmit the delayed association request 235, the requests 235 can be spread over multiple time slots. Where the number of STAs 106 is greater than the number of available time slots, controlling when each device assigned to the same time slot transmits can improve efficiency. In various embodiments, the STAs 106 can be configured to delay transmission of association requests 235 as described below in greater detail with respect to FIG. 12.

In some implementations, the AP 104 can be configured to indicate a window of time during which the STAs 106 should transmit association requests 235. Accordingly, the AP 104 can perform other tasks outside the indicated time window, such as processing data for previously associated devices. Scheduling association request 235 processing in this manner can therefore increase efficiency. In various embodiments, the AP 104 can be configured to indicate an association request transmit window as described below in greater detail with respect to FIG. 13.

Access Response Window

In some implementations, the AP 104 can schedule transmission of access responses (e.g., probe responses 215 and/or association responses 240) during an access response window 250. For example, the AP 104 can be configured to transmit access response messages during specified transmit windows. The access response window 250 can be dynamic, for example based on the number of pending responses. In some implementations, the AP 104 can also be configured to request a contention free period (e.g., clear-to-send) before transmitting the access response message. Accordingly, signal collisions can be reduced. In various embodiments, the AP 104 can schedule the access response window 250 as described below in greater detail with respect to FIG. 11.

Service Load Information

In some implementations, the AP 104 can transmit channel load information 245 to the STAs 106. The STAs 106 can determine a communication channel based on the channel load information 106. In some embodiments, the AP 104 can provide one or more channels for communication with the STAs 106. In some implementations, each channel corresponds to a different frequency. As each channel can experience a different signal load, some channels can be busier than other channels. Accordingly, in some cases, the STAs 106 can increase network performance by diverting traffic to under-utilized (e.g., lower load) channels.

In some embodiments, the AP 104 can transmit channel load information 245 including load information for at least one other AP. For example, the AP 104 may be logically related to another nearby AP (not shown). The AP 104 can determine load information of the other AP, for example, via a backhaul connection, or by receiving the channel load information 245 from the other AP. In some cases, the STAs 106 can increase network performance by choosing an AP to associate with based on the channel load information 245. For example, if the AP 104 is under a heavy load, a STA 106 can be configured to access the other AP. Because the other AP is less loaded, association time can be reduced.

In some embodiments, the AP 104 can transmit the channel load information 245 as discussed in greater detail below with respect to FIG. 15. The STAs 106 can receive the channel load information 245 as discussed in greater detail below with respect to FIG. 16. The channel load information 245 can include a probe response including a neighbor network element as described in further detail below with respect to FIG. 6.

Network Domains

A network operator can associate one or more APs into a logical grouping. In some implementations, this logical grouping can be referred to as a network domain. An AP can be included in more than one network domain. For example, the AP 104 can be associated with a first network domain grouping APs configured for multimedia communication and a second network domain grouping APs configured for video chat communication. Each network domain can be associated with a network domain identifier. An example network domain identifier element 500 is shown and described in further detail in reference to FIG. 5.

The STAs 106 can use the network domain identifier 500 (FIG. 5) to access any AP 104 belonging to the identified network domain. A network domain identifier 500 can include one or more of a value identifying a specific network operator and/or telecommunication service provider, a value identifying an application, a value identifying a class of an application (e.g., chat, text, video, multimedia), and a universal resource location (e.g., a website address). An example of a network domain identifier is a public land mobile network identifier. In some implementations, a public land mobile network identifier can include a mobile country code and a mobile network code associated with the network operator and/or telecommunication service provider.

The network domain identifier can be included in and/or derived from other network identifiers such as an international mobile subscriber identity (IMSI), tracking area code (TAI), globally unique temporary UE identity (GUTI), evolved universal mobile telecommunications system terrestrial radio access network (E-UTRAN) cell identifier (ECGI), etc. In implementations where the network domain identifier is derived, the derivation can include calculating the identifier based on the provided values, using a portion (e.g., a number of most significant bits, bits at a specified location) of the provided value, obtaining the network domain identifier through a look-up service (e.g., database, remote directory, etc.), or combining portions (e.g., a number of most significant bits, bits at a specified location) of two or more provided values. Accordingly, a STA 106 need not specifically identify a particular AP 104 to access, but can identify a domain of APs with which to associate. Thus, a STA 106 can more quickly establish a link with the AP 104 by identifying a generic group of APs rather and explicitly identifying the AP 104 to associate with.

In some embodiments, the AP 104 can transmit the network domain identifiers as discussed in greater detail below with respect to FIG. 17. In some embodiments, the STAs 106 can receive the network domain identifiers as discussed in greater detail below with respect to FIG. 18. For example, the AP 104 can include the network domain identifiers in one or more of the beacon 205, probe responses 215, and/or the compressed beacon 224. The STAs 106 can associate with the AP 104, via the association requests 230, based on the network domain identifier of the AP 104.

FIG. 3 shows an exemplary compressed beacon 300 that can be employed within the wireless communication system 100 of FIG. 1. The compressed beacon 300 shown in FIG. 3 can be included in one or more of the implementations described herein to improve messaging based on beacons. For example, the compressed beacon 300 can include the compressed beacon 225 (FIG. 2). A transmitting device, such as the AP 104 (FIG. 2), can transmit the compressed beacon 225 (FIG. 2), thereby expending fewer resources (e.g., power, processing, memory, air time, bandwidth) than would be expended to transmit a full-size beacon 205 (FIG. 2). A receiving device, such as the STAs 106 (FIG. 2), can similarly consume fewer resources to receive and process the beacon 300. In either device, this can result in an expedited message processing, such as expedited initial link setup.

In the illustrated embodiment, the compressed beacon 300 includes a frame control (FC) field 302, a source address (SA) field 304, a compressed SSID 306, a timestamp 308, a change sequence field 310, an information field 312, one or more information elements (IEs), and a cyclic redundancy check 316. A person having ordinary skill in the art will appreciate that the compressed beacon 300 can include additional fields, and fields can be rearranged, removed, and/or resized.

In the example shown, the frame control field 302 is two octets. In some implementations, the frame control field 302 can be one, four, or ten octets. In some implementations the frame control field 302 can be of variable length from signal to signal. The frame control field 302 can include values indicating characteristics that help a receiving device identify the compressed beacon 300 as such. For example, the frame control field 302 can include information such as an identifier of the frame type (e.g., management, control, data) or a protocol version for the frame.

In the example shown, the source address field 304 is six octets. In some implementations, the source address field 304 can be one, four, or ten octets. In some implementations the source address field 304 can be of variable length from signal to signal. The source address field 304 can include information to help a receiving device identify the source of the beacon 300 such as a MAC address, a virtual identifier (e.g., as described above), a shortened SSID (e.g., as described above), and the like.

In the example shown, the compressed SSID field 306 is of variable length. The length of the compressed SSID field 306 can vary from signal to signal and/or from service provider to service provider. In some implementations, the compressed SSID field 306 can be fixed-length, such as one, four, or ten octets. The compressed SSID field 306 can include an identifier as described above.

In the example shown, the timestamp field 308 is four octets. In some implementations, the timestamp field 308 can be three, six, or ten octets. In some implementations the timestamp field 308 can be of variable length from signal to signal and/or from service provider to service provider. The timestamp field 308 includes information about the time the compressed beacon 300 was generated.

In the example shown, the change sequence field 310 is one octet. In some implementations, the change sequence field 310 can be four, six, or ten octets. In some implementations the change sequence field 310 can be of variable length from signal to signal and/or from service provider to service provider. The change sequence field 310 allows devices receiving the signal to keep track of changes to an AP. In one implementation, the AP can decrement the value of the change sequence field 310, change the change sequence field 310 to a random or pseudorandom number, or otherwise modify change sequence field 310 when the configuration of the AP changes. A device, such as a STA 106 (FIG. 1) receiving the compressed beacon 300 can be configured to detect the change in the change sequence field 310 and respond accordingly. In various embodiments, the change sequence field 310 can be referred to as a beacon number field or a beacon index field.

The information field 312, as shown in FIG. 3, is of variable length. The length of the information field 312 can vary from signal to signal and/or from service provider to service provider. In some implementations, the information field 312 can be fixed length, such as one, four, or ten octets. The information field 312 can include various information about the transmitting device (e.g., load information as described above), the service provider, data, configuration information, and the like.

The optional IEs field 314 shown can include one or more informational elements. Each informational element can be one or more octets in length. An example of an optional information element is an authentication challenge value (e.g., anonce).

As shown, the CRC field 316 is a four octet field. In some implementations, the CRC field 316 can be two, six, or ten octets. In some implementations the CRC field 316 can be of variable length from signal to signal and/or from service provider to service provider. The CRC field 316 can be used for error detection by the transmitter or receiver of the compressed beacon 300.

The compressed beacon 300, in part due to its short nature, can provide several desirable aspects. First, the compressed beacon 300 requires fewer resources to transmit. For example, the shorter beacon can include less data and thus requires fewer processor cycles to prepare and transmit. This has the additional effect of reducing the power needed to transmit the signal. As a shorter signal can also be transmitted more quickly than a longer signal, the overall traffic for the transmitter can be reduced. On the receiving end, the same benefits can be attained. As the signal can be shorter, the receiver processes fewer bits of data thereby reducing the resources needed to receive and process the signal as compared to a longer beacon. In the context of the beacon 300, the net effect can be to reduce the overall time to establish an initial link between the AP 104 (FIG. 1) and the STAs 106 (FIG. 1).

Figure 4:
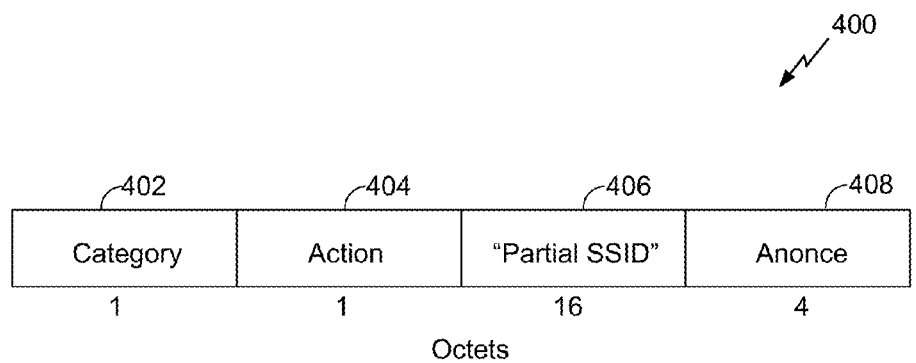
FIG. 4 shows an exemplary action management frame that can be employed within the wireless communication system of FIG. 1.

FIG. 4 shows an exemplary action management frame 400 that can be employed within the wireless communication system 100 of FIG. 1. This action management frame 400 can include association information to enable network link setup in the implementations described herein. As shown, the action management frame 400 includes a category field 402, an action field 404, a partial SSID 406, and an anonce field 408. A person having ordinary skill in the art will appreciate that the action management frame 400 can include additional fields, and fields can be rearranged, removed, and/or resized.

The category field 402 as shown is one octet. In some implementations, the category field 402 can be two, four, or twelve octets. In some implementations, the category field 402 can be of variable length, such as from signal to signal and/or as between service providers. The category field 402 provides information that identifies the type of management frame being transmitted. In this case, the category can be "action."

The action field 404 shown in FIG. 4 is a one octet field. In some implementations, the action field 404 can be two, four, or twelve octets. In some implementations, the action field 404 can be of variable length, such as from signal to signal and/or as between service providers. The action field 404 can identify an action associated with the category specified in the category field 402.

The partial SSID can be generated as described above. The partial SSID field 406 shown is sixteen octets. In some implementations, the partial SSID field 406 can be two, twelve, or twenty-one octets. In some implementations, the partial SSID field 406 can be of variable length, such as from signal to signal and/or as between service providers. The partial SSID field 406 can include a value indicating a partial identifier that can be used by a receiving device to associate with the transmitting device.

The anonce field 408 shown in FIG. 4 is four octets. In some implementations, the anonce field 408 can include two, seven, or twelve octets. In some implementations, the anonce field 408 can have a variable length, whereby the length of the anonce field 408 varies from signal to signal and/or as between service providers. The anonce field 408 can include a value representing an authentication challenge value that can be used to create an initial link between a STA 106 (FIG. 1) and an AP 104 (FIG. 1), as described above.

Figure 5:
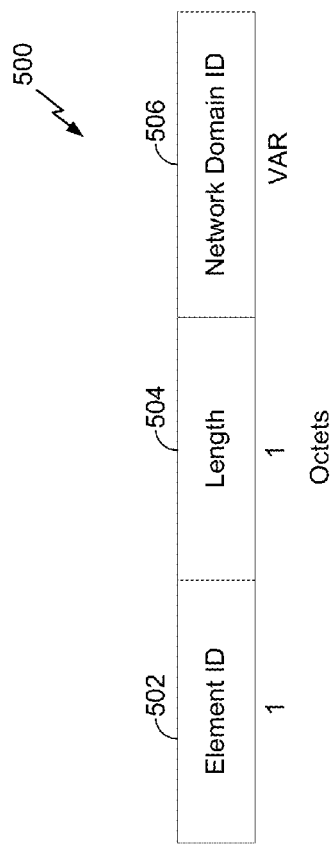
FIG. 5 shows an exemplary network domain identifier element that can be employed within the wireless communication system of FIG. 1.

FIG. 5 shows an exemplary network domain identifier element 500 that can be employed within the wireless communication system 100 of FIG. 1. The network domain identifier element 500 can indicate the identity of the network domain. As shown, the network domain identifier element 500 includes an element identifier field 502, a length field 504, and a network domain identifier field 506. A person having ordinary skill in the art will appreciate that the network domain identifier element 500 can include additional fields, and fields can be rearranged, removed, and/or resized.

As discussed above with respect to FIG. 2, the network domain identifier element 500 can be used in the probe request 210 to indicate the network domain from which the STA 106 requests a probe response 215. The network domain identifier element 500 can be used in a probe response 215 or beacon frame 205 or 225 to indicate the network domain identifier associated with the access point 104 (FIG. 2). If the AP 104 belongs to multiple network domains, then the AP 104 can include more than one network domain identifier element 500 in the beacon 205 or probe response 215.

The element identifier field 502 shown is one octet long. In some implementations, the element identifier field 502 can be two, five, or twelve octets long. In some implementations, the element identifier field 502 can be of variable length, such as varying length from signal to signal and/or as between service providers. The element identifier field 502 can include a value which identifies the element as a network domain identifier element 500.

The length field 504 can be used to indicate the length of the network domain identifier included in the network domain identifier element 500. The length field 504 shown in FIG. 5 is one octet long. In some implementations, the length field 504 can be two, five, or twelve octets long. In some implementations, the length field 504 can be of variable length, such as varying length from signal to signal and/or as between service providers.

The network domain identifier field 506 can be configured to indicate a value identifying the network domain. As discussed above, a network domain identifier can include one or more of a value identifying of a specific network operator and/or telecommunication service provider, a value identifying an application, a value identifying a class of an application (e.g., chat, text, video, multimedia), and a universal resource location (e.g., website address).

In the example shown in FIG. 5, the network domain identifier field 506 is a variable length field. In some implementations, the network domain identifier field 506 can be a fixed length field (e.g., five octets, six octets, twelve octets). The length of the network domain identifier field 506 can be common for all signals, common for all signals for a network operator, or vary for all signals. Accordingly, the length of the network domain identifier field 506 can be configured.

Figure 6:
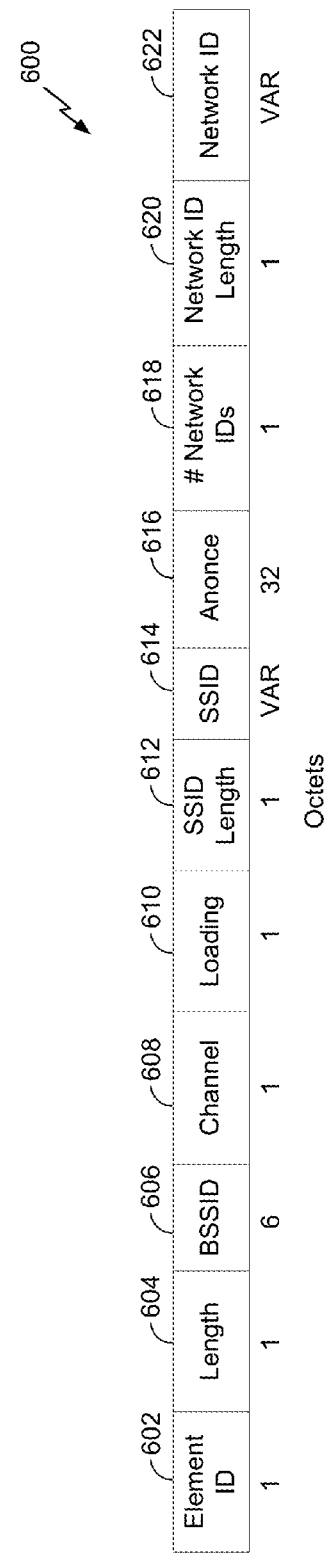
FIG. 6 shows an exemplary neighbor network element that can be employed within the wireless communication system of FIG. 1.

FIG. 6 shows an exemplary neighbor network element 600 that can be employed within the wireless communication system 100 of FIG. 1. The neighbor network element 600 can include information about other networks in the vicinity of an AP transmitting the signal including the neighbor network element 600. As shown, the neighbor network element 600 includes an element identifier field 602, a length field 604, a basic service set identifier (BSSID) field 606, a channel field 608, a loading field 610, a SSID length field 612, a SSID field 614, an anonce field 616, a number of network IDs field 618, a network ID length field 620, and a network ID field 622 for each network domain to which the neighbor network belongs. A person having ordinary skill in the art will appreciate that the neighbor network element 600 can include additional fields, and fields can be rearranged, removed, and/or resized.

As discussed above with respect to FIG. 2, the AP 104 can include the neighbor network element 600 in a beacon 205 or 225 or probe response 215 to enable the STAs 106 to determine if another AP should be considered for association. The element identifier field 602 can be similar to the element identifier field 502 described above with respect to FIG. 5. The length field 604 can be similar to the length field 504 described above with respect to FIG. 5.

The BSSID field 606 can include the BSSID of the neighboring network. The channel field 608 can indicate the operating channel of neighboring network. The loading field 610 can identify the load factor for the operating channel. The SSID length field 612 can include a value indicating the length of the SSID included in the neighbor network element 600. The SSID field 614 can include the SSID value of the neighboring network.

The anonce field 616 can include an authentication challenge value that a STA 106 (FIG. 1) can use to associate with the identified neighbor network. The number of network IDs field 618 can indicate the number of network domain IDs to which the neighboring network belongs. The network ID length field 620 can indicate the length of the network ID field 622, which can include a network ID for each network domain the neighbor network belongs to. As shown in FIG. 6, only one domain is specified. However, the network ID length field 620 and the network ID field 622 can repeat for each domain. Accordingly, more than one instance of each field listed above can be included in the signal to allow multiple channels and multiple neighbors to be identified.

While the fields shown in the neighbor element 600 can have identified octet lengths, it will be understood that the field lengths shown are exemplary and other octet lengths can be used. For example, the anonce field 616 is shown as including 32 octets, but in some implementations, it can be desirable to include 9 octets for this field. Furthermore, it will be understood that where a field is defined as a fixed length field, in some implementations, it can be desirable to provide the field as a variable length field. Finally, it will be understood that the example network neighbor element 600 can omit certain fields (e.g., network ID length) or include additional fields (e.g., description) without departing from the scope of the disclosure.

Figure 7:
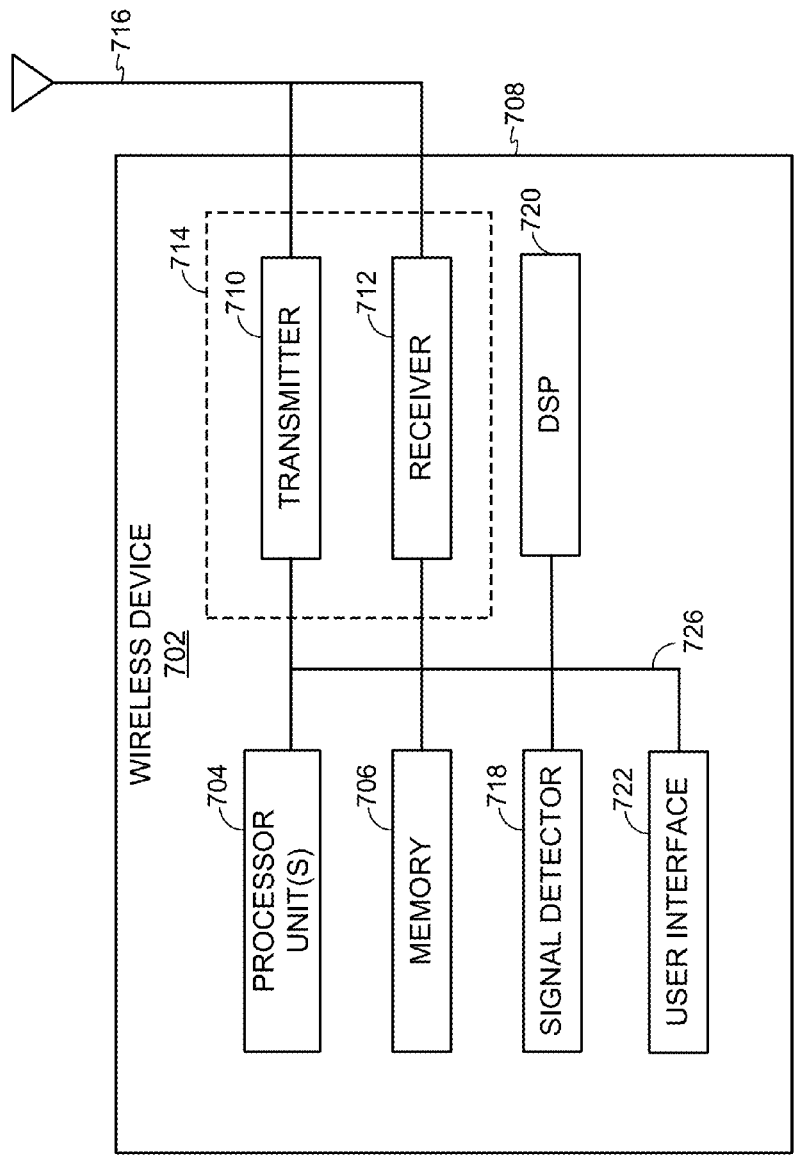
FIG. 7 shows a functional block diagram of an exemplary a wireless device that can be employed within the wireless communication system of FIG. 1.

FIG. 7 shows a functional block diagram of an exemplary a wireless device 702 that can be employed within the wireless communication system 100 of FIG. 1. The wireless device 702 is an example of a device that can be configured to implement the various methods described herein. For example, the wireless device 702 can include the AP 104 and/or one of the STAs 106.

The wireless device 702 can include one or more processor units 704 which are configured to control operation of the wireless device 702. One or more of the processor units 704 can be collectively referred to as a central processing unit (CPU). A memory 706, which can include both read-only memory (ROM) and random access memory (RAM), provides instructions and data to the processor units 704. A portion of the memory 706 can also include non-volatile random access memory (NVRAM). The processor units 704 can be configured to perform logical and arithmetic operations based on program instructions stored within the memory 706. The processor 704 can be configured to implement one or more methods described herein, for example in conjunction with executable instructions in the memory 706.

When the wireless device 702 is implemented or used as an AP, the processor 704 can be configured to expedite the discovery of the AP by a STA and the creation of a link with a STA. The processor 704 can be further configured to reduce contention for AP resources. For example, a high volume of STAs requesting access can cause packet collisions or dropping of packets. Various processes to expedite connection and improve resource utilization are described in further detail herein.

When the wireless device 702 is implemented or used as a STA, the processor units 704 can be configured to expedite the discovery of an AP and the creation of a link with the AP. The processor units 704 can be further configured to reduce contention for AP resources. For example, through passive listening, a STA can acquire the information needed to establish a link with an AP without directly requesting the information from the AP. This and various other processes to expedite connection and improve resource utilization are described in further detail below.

The processor units 704 can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor units 704 include a DSP, the DSP can be configured to generate a packet (e.g., a data packet) for transmission. In some aspects, the packet can include a physical layer data unit (PPDU).

The wireless device 702 can also include machine-readable media for storing software. The processing units 704 can include one or more machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the processor units 704, cause the wireless device 702 to perform the various functions described herein.

The wireless device 702 can include a transmitter 710 and/or a receiver 712 to allow transmission and reception, respectively, of data between the wireless device 702 and a remote location. The transmitter 710 and receiver 712 can be combined into a transceiver 714. An antenna 716 can be attached to the housing 708 and electrically coupled with the transceiver 714. The wireless device 702 can also include (not shown) multiple transmitters, multiple receivers, multiple transceivers, and/or multiple antennas.

The transmitter 710 can be configured to wirelessly transmit packets and/or signals. For example, the transmitter 710 can be configured to transmit different types of packets generated by the processor units 704, discussed above. The packets are made available to the transmitter 701. For example, the processor units 704 can store a packet in the memory 706 and the transmitter 701 can be configured to retrieve the packet. Once the transmitter retrieves the packet, the transmitter 701 transmits the packet to a STA 106 wireless device 702 via the antenna 716.

An antenna 716 on the STA 106 wireless device 702 detects wirelessly transmitted packets/signals. The STA 106 receiver 712 can be configured to process the detected packets/signals and make them available to the processor units 704. For example, the STA 106 receiver 712 can store the packet in memory 706 and the processor units 704 can be configured to retrieve the packet.

The wireless device 702 can also include a signal detector 718 that can be used in an effort to detect and quantify the level of signals received by the transceiver 714. The signal detector 718 can detect such signals as total energy, energy per subcarrier per symbol, power spectral density, and other signals. The wireless device 702 can also include a digital signal processor (DSP) 720 for use in processing signals. The DSP 720 can be configured to generate a packet for transmission. In some aspects, the packet can include a physical layer data unit (PPDU).

The wireless device 702 can further include a user interface 722 in some aspects. The user interface 722 can include a keypad, a microphone, a speaker, and/or a display. The user interface 722 can include any element or component that conveys information to a user of the wireless device 702 and/or receives input from the user. The wireless device 702 can also include a housing 708 surrounding one or more of the components included in the wireless device 702.

The various components of the wireless device 702 can be coupled together by a bus system 726. The bus system 726 can include a data bus, for example, as well as a power bus, a control signal bus, and a status signal bus in addition to the data bus. Those of skill in the art will appreciate the components of the wireless device 702 can be coupled together or accept or provide inputs to each other using some other mechanism.

Although a number of separate components are illustrated in FIG. 7, those of skill in the art will recognize that one or more of the components can be combined or commonly implemented. For example, the processor units 704 can be used to implement not only the functionality described above with respect to the processor units 704, but also to implement the functionality described above with respect to the signal detector 718. Further, each of the components illustrated in FIG. 7 can be implemented using a plurality of separate elements.

Figure 8:
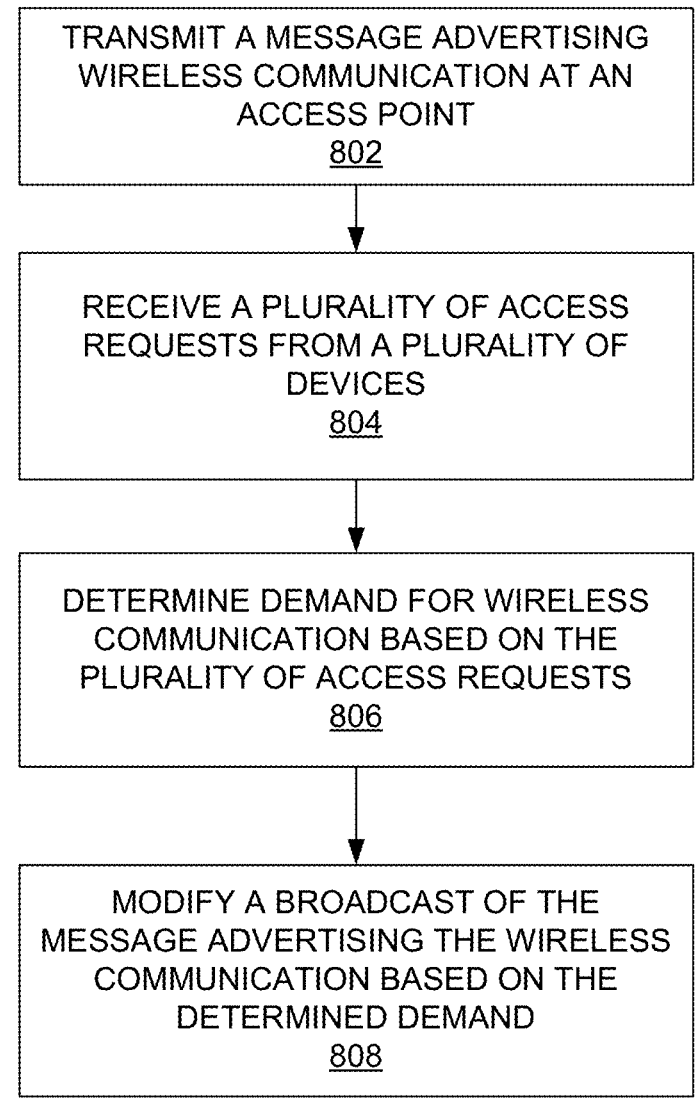
FIG. 8 shows a flowchart for an exemplary method of wireless communication that can be employed within the wireless communication system of FIG. 1.

FIG. 8 shows a flowchart for an exemplary method of wireless communication that can be employed within the wireless communication system 100 of FIG. 1. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

First, at block 802, the AP 104 transmits a message advertising wireless communication. The AP 104 can transmit the message to a specific device, a specific group of devices, or to any device configured to receive the signal. For example, as discussed above with respect to FIG. 2, the AP 104 can broadcast the beacon 205. As another example, the AP 104 can transmit one or more probe responses 215.

Then, at block 804, the AP 104 receives a plurality of access requests from the STAs 106. For example, the AP 104 can receive the probe requests 210.

Next, at block 806, the AP 104 detects a change in a number of access requests over a period of time so as to determine a change in network congestion. For example as discussed above with respect to FIG. 2, more probe requests 210 can be received when the STAs 106 move into range of the AP 104, than when the STAs 106 are not in range. Accordingly, the number of access requests can be indicative of an increased number of STAs 106 attempting to associate with an access point. The change detection can be based on one or more of a number of requests, a rate of requests, request message signal strengths, a request message type, or the like.

Subsequently, at block 808, the AP 104 modifies a broadcast of the message advertising wireless communication based on the detected change so as to satisfy the change in demand. For example, if a train arrival is accompanied by a spike in the number of access requests, such as probe requests 210, the AP 104 can begin broadcasting advertising messages such as probe responses 215 at a regular interval rather than responding individually to each probe request. 210. The STAs 106 can receive the broadcast probe responses 215 and can use the information contained therein.

As an increase in demand for network access is detected, the AP 104a can switch from unicasting probe responses 215 messages to broadcasting probe responses 215. If a further increase is detected, the AP 104 can increase the rate at which the probe responses 215 are broadcast. Conversely, as the rate of access request messages decreases, the AP 104 can switch to a lower broadcast rate for access probe responses 215. In some instances, the AP 104 can stop broadcasting probe responses 215 and can return to the unicast mode for probe responses 215.

In some implementations, the alteration of the broadcast of an access response includes increasing a modulation coding scheme (MCS) rate identified in the access response message. Generally, the STAs 106 can begin negotiating a link with an AP 104 at a low MCS rate. Once the link is established, the STAs 106 and the AP 104a can increase the MCS rate. Rather than slowly ramping up to the higher MCS rate, during periods of high traffic, the AP 104a can increase the MCS rate identified in the access response message. This allows the STAs 106 faster access for a longer period of time. In one example, upon determining an increase in traffic, the processor 204 can instruct the transmitter 710 to use the higher MCS rate value for access response messages transmitted by the wireless communication device.

In some implementations, the AP 104 can modify broadcast of the beacon 205. For instance, during high traffic periods, the AP 104 can shorten or compress the beacon 205 to expedite the transmission of the beacon 205. The shortened or compressed beacon 225 can also reduce the amount of processing required to decode the signal. Each of these can reduce the amount of time taken to establish a link between the STAs 106 and an AP 104. The compressed beacon 225 can include an authentication challenge value (e.g., anonce) for secure association between the AP 104a and the STAs 106. The authentication challenge value can be included in an information element (e.g., optional information element) of the beacon 225. In some implementations, the STAs 106 can use the compressed beacon 225 to associate with the AP 104 in lieu of an access response message such as a broadcast probe response 215. The compressed beacon 225 can be compressed by shortening the length of the beacon as compared to an uncompressed beacon 205. An example of a compressed beacon is shown in FIG. 3.

In some implementations, the AP 104 can transmit a full beacon 205, or a beacon including the elements that can be used by the STA to associate with the AP 104 can be transmitted. An example beacon 205 can include a fast initial link setup (FILS) beacon. The transmission can be performed according to a schedule, for example multiple times within a target beacon transmission time (TBTT). In some implementations, to reduce the medium occupancy, these beacons 205 can be transmitted at a higher transmission rate (e.g., transmitted according to a modulation and coding scheme (MCS)). Accordingly, the STAs 106 that are able to decode the higher MCS beacon 205 can begin associating with the access point without waiting for additional association information. For example, a STA 106 located closer to the AP 104 is more likely to receive and decode the higher MCS beacon than another STA 106 located further from the AP 104. Accordingly, the closer STA 106 can associate with the AP 104 based on the higher MCS beacon. By allowing an early association of the STAs 106 closer to the AP 104, the rate of device association can be slowed, which can reduce congestion in the network as well as at the AP 104.

In some implementations, the AP 104 can implement a new class for beaconing frequency. The class can include a large arbitration interframe space (AIFS) such as short interframe spaces along with seven slots. Other numbers of slots can be specified, such as 2, 3, or 12, without departing from the spirit of the description. The class can further include a large contention window size such as, for example, 1023. Accordingly, if the AP 104 detects no additional network traffic, the AP 104 can transmit the beacon 205 approximately every millisecond. In some implementations, the AP 104 can transmit the beacon 205 at a lower power and/or lower priority than a previously transmitted beacon.

In an embodiment, the method shown in FIG. 8 can be implemented in a wireless device that can include a broadcast circuit, a receiving circuit, a detecting circuit, and a modification circuit. Those skilled in the art will appreciate that a wireless device may have more components than the simplified wireless device described herein. The wireless device described herein includes only those components useful for describing some prominent features of implementations within the scope of the claims.

The broadcast circuit can be configured to broadcast a message advertising the wireless communication of the wireless communication system. The broadcast circuit can include one or more of the antenna 716 (FIG. 7), a signal generator, a power source, an amplifier, the transmitter 710 (FIG. 7), and the memory 706 (FIG. 7). In some implementations, means for broadcasting can include the broadcast circuit.

The receiving circuit can be configured to receive a plurality of request messages from a plurality of devices. The receiving circuit can include one or more of the receiver 712 (FIG. 7), the antenna 716 (FIG. 7), the processor 704 (FIG. 7), and the memory 706 (FIG. 7). In some implementations, means for receiving include the receiving circuit.

The detecting circuit can be configured to detect a change in a number of request messages for the communication service over a period of time so as to determine a change in demand for the communication service. The detecting circuit can include one or more of the processor 704 (FIG. 7), the memory 706 (FIG. 7), a clock, a counter, an arithmetic unit, and a comparator. Means for detecting can include, for example, the detecting circuit.

The modification circuit can be configured to modify the broadcast of the message advertising the wireless communication based in part on the detected change so as to satisfy the change in demand. The modification circuit can include one or more of the processor 704 (FIG. 7), a comparator, the DSP 720 (FIG. 7), the memory 706 (FIG. 7), and a frequency generator. In some implementations, means for modifying the broadcast of the signal include the modification circuit.

Figure 9:
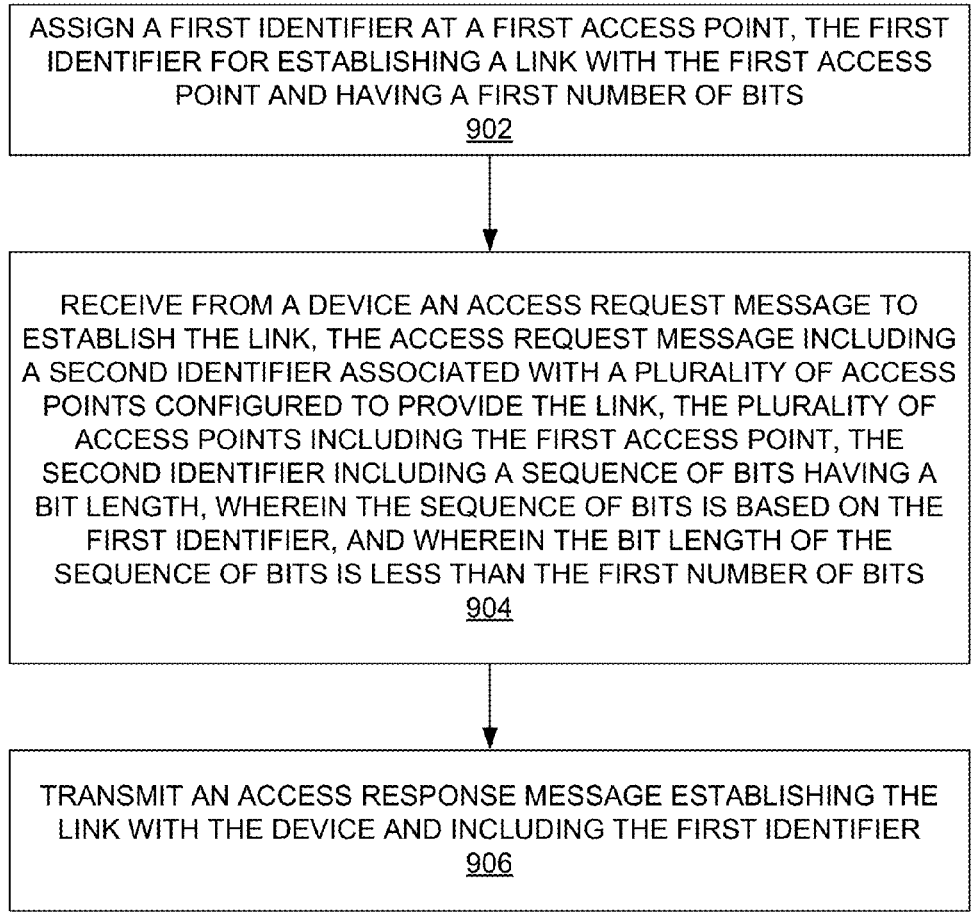
FIG. 9 shows a flowchart for another exemplary method of wireless communication that can be employed within the wireless communication system of FIG. 1.

FIG. 9 shows a flowchart for another exemplary method of wireless communication that can be employed within the wireless communication system 100 of FIG. 1. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

First, at block 902 a first identifier is assigned to an access point, such as an the AP 104. The first identifier is assigned for establishing a link with the AP 104 and includes a first number of bits. The first identifier can be statically assigned, such as in memory (e.g., pre-loaded, SIM card, USB drive, floppy disk). The first identifier can be assigned by a service provider at the time of device purchase. The first identifier can be assigned dynamically such as by receiving the identifier via wired or wireless signaling. Other methods of assigning an identifier can also be applied. The identifier has a particular bit length. For example, the identifier can be an SSID assigned to the AP 104.

In an embodiment, all the APs 104a-104b of a particular provider can have an identifier with one or more common bits. For example, the SSID of the APs 104a-104b can begin with the same bit sequence. Accordingly, STAs 106 can isolate communications to a given provider by addressing communications using the common bits associated with the provider. For example, with reference to FIG. 1, the APs 104a and 104b can belong to the same provider. Accordingly, the SSIDs for the APs 104a and 104b can be assigned as shown in Table 1.

TABLE 1

| Access Point | Assigned SSID |
| --- | --- |
| AP 104a | 11111111-22222222-33333333-44444444 |
| AP 104b | 11111111-22222222-33333333-55555555 |

Next, at block 904, the AP 104 receives an access request message to establish the link from a device. For example, the AP 104 can receive a probe request 210 or an association request 230 or 235 from a STA 106. The access request message includes a second identifier associated with a plurality of devices configured to provide the link, the plurality of devices including the device, the second identifier including a sequence of bits having a bit length, wherein the sequence of bits is based on the first identifier, and wherein the bit length of the sequence of bits is less than the first number of bits. As shown in Table 1, the SSIDs of both APs 104a and 104b, begin with the same 24-characters, but end with different characters. Accordingly, the STA 106 configured to associate with the provider of the AP 104a or 104b need only request access using the first 24-characters. The STA can copy the sequence of bits from the first identifier. In some implementations, the sequence of bits can be derived from the first identifier. For example, a hash function can be applied to generate the sequence of bits from the first identifier.

Then, at block 906, the AP 104 transmits an access response message to the STA 106, which includes the first identifier. For example, the AP 104 can transmit a probe response 215 and/or an association response 240 to the STA 106. In some implementations, the access response message can include the full SSID for the AP 104 that is ready for association with the requesting STA 106. For example, with respect to FIG. 1, a STA 106 can transmit an access request message (e.g., a probe request 210), including only the first 24-characters of an SSID. In an implementation where the APs 104a and 104b are associated with the same provider, both can receive the message and transmit an access request response (e.g., a probe response 215).

In an implementation where AP 104a is associated with a different provider than AP 104b, each can be assigned a different initial 24-character SSID. If the AP 104a or 104b receives an access request message including a matching 24-character SSID, it can transmit a response. If the AP 104a or 104b receives an access request signal including a different 24-character SSID than is assigned to the AP, the AP 104a or 104b can ignore the access request message. Accordingly, the AP 104a-104b can reduce contention for message processing and transmission resources by identifying access request messages that are not intended for the AP 104a-104b. Moreover, the STAs 106 can transmit fewer bits thereby speeding up the transmission, processing time at the APs 104a-104b, and ultimately link setup time.

In an embodiment, the method shown in FIG. 9 can be implemented in another exemplary wireless device that can include an assigning circuit, a receiving circuit, and a transmitting circuit. Those skilled in the art will appreciate that a wireless device may have more components than the simplified wireless device described herein. The wireless device described herein includes only those components useful for describing some prominent features of implementations within the scope of the claims.

The assigning circuit can be configured to store a first identifier for the wireless device, the first identifier for establishing a link with the device and having a first number of bits. The assigning circuit can include a storage (e.g., memory, SIM card). The assigning circuit can include a transceiver. In some implementations, means for assigning include the assigning circuit.

In some implementations the receiving circuit can be configured to receive from a device an access request message to establish the link, the access request message including a second identifier associated with a plurality of devices configured to provide the link, the plurality of devices including the apparatus, the second identifier including a sequence of bits having a bit length, wherein the sequence of bits is based on the first identifier, and wherein the bit length of the sequence of bits is less than the first number of bits. The receiving circuit can include one or more of the antenna 716 (FIG. 7), the receiver 712 (FIG. 7), and the processor 704 (FIG. 7). In some implementations, means for receiving include receiving circuit.

In one implementation, the transmitting circuit can be configured to transmit an access response message establishing the link with the apparatus and including the first identifier. In some implementations, the transmitting circuit can be further configured to transmit a signal including an identifier including fewer bits than a full identifier for the AP as described above in reference to FIG. 9. For example, the signal can be a management frame, such as an action frame, including one or more fields. The fields can be of variable length (e.g., octets). For example, one signal can include an action frame including a 1 octet category field, a 1 octet action field, a 16 octet identifier field, and a 4 octet authentication challenge value (e.g., anonce) field. In another implementation, the identifier field can be an 8, 4, 9, or 20 octet field. Similar variation can be included for the other fields without departing from the scope of the disclosure. An example action management frame is shown in FIG. 4 and described in further detail below. The transmitting circuit can include the antenna 716 (FIG. 7), the transmitter 710 (FIG. 7), and the processor 704 (FIG. 7). In some implementations, means for transmitting include the transmitting circuit.

Figure 10:
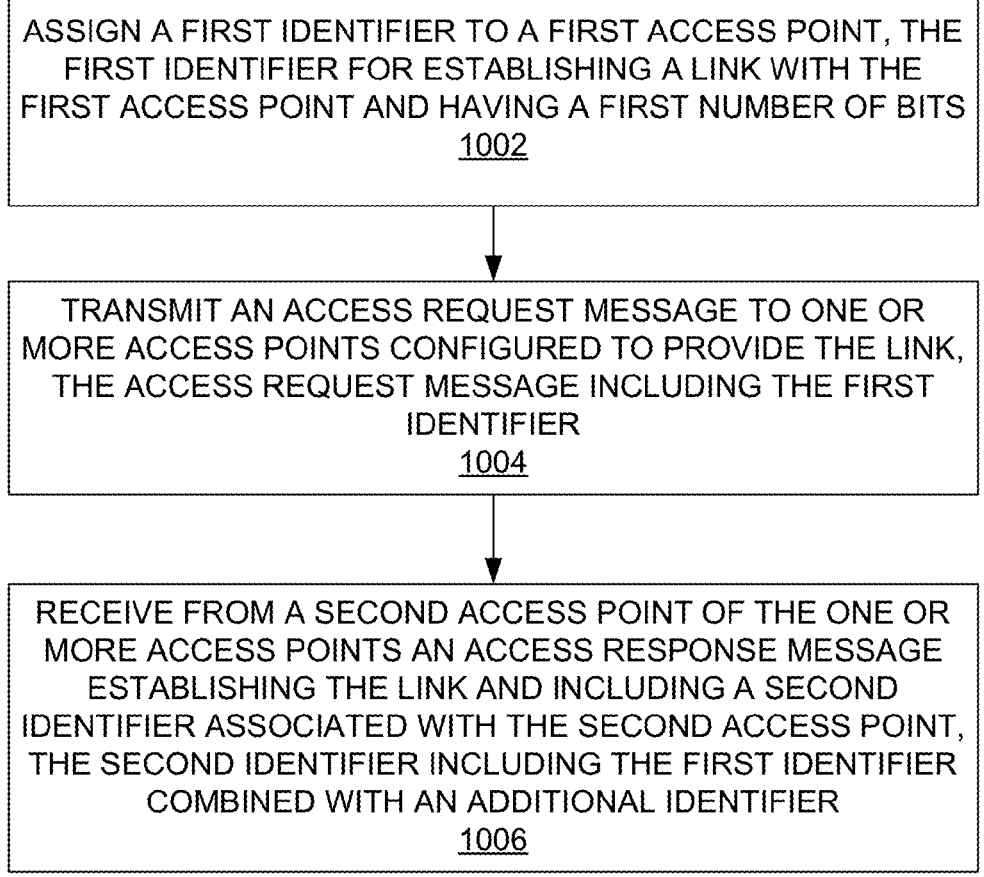
FIG. 10 shows a flowchart for another exemplary method of wireless communication that can be employed within the wireless communication system of FIG. 1.

FIG. 10 shows a flowchart for another exemplary method of wireless communication that can be employed within the wireless communication system 100 of FIG. 1. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

First, at block 1002, a first identifier is assigned to the AP 104. The first identifier is assigned for establishing a link with the AP 104 and includes a first number of bits. The identifier has a particular number of bits. In the case where the method is implemented in a STA 106, the identifier assigned can be an SSID or BSSID corresponding to the service provider of the STA 106. The first identifier number of bits being less than a typical identifier for the wireless communication system. In some implementations, the first identifier can be associated with multiple access points.

Next, at block 1004, the STA 106 transmits an access request signal including the first identifier to one or more APs 104a-104b configured to provide the wireless link. As shown above in Table 1, if a STA 106 is associated with the provider of APs 104a and 104b, the STA 106 can transmit only the first 24-characters of the SSID.

Then, at block 1006, the STA 106 receives an access response message from one of the one or more APs 104a-104b, establishing the link and including a second identifier associated with the AP. The second identifier can include the first identifier combined with an additional identifier. The access response message can include one or more parameters that can be used to setup a link. For example, the access response message can be a probe response 215 including the full SSID of an AP 104 that is capable of providing service to the requesting STA 106.

In some implementations, the STA 106 can receive multiple access response messages. For example, with respect to FIG. 1, each of the APs 104a and 104b can receive the access request message including the first 24-characters of a common SSID. Both the APs 104a and 104b can transmit an access response message. The STA 106 can then select which AP will service the STA 106 most appropriately, based on the information contained in the access response message. For example, the AP 104a may operate at a faster data rate than the AP 104b. In some implementations, the association can be performed by one or more backhaul exchange messages. Accordingly, the method can include associating the STA 106 with one of multiple APs responding to the initial access request message. In some implementations, the combination of the first and additional identifier can include concatenating, appending, and/or interleaving the identifiers.

In an embodiment, the method shown in FIG. 10 can be implemented in another exemplary wireless device that can include an assigning circuit, a transmitting circuit, and a receiving circuit. Those skilled in the art will appreciate that a wireless device may have more components than the simplified wireless device described herein. The wireless device described herein includes only those components useful for describing some prominent features of implementations within the scope of the claims.

In one implementation, the assigning circuit can be configured to store a first identifier, the first identifier for establishing a link with the wireless communication system and having a first number of bits. The assigning circuit can include a storage (e.g., memory, SIM card). The assigning circuit can include a transceiver. In some implementations, means for assigning include the assigning circuit. In one implementation, the transmitting circuit can be configured to transmit an access request message to one or more entities configured to provide the link, the access request message including the first identifier. The transmitting circuit can include the antenna 716 (FIG. 7), the transmitter 710 (FIG. 7), and the processor 704 (FIG. 7). In some implementations, means for transmitting include the transmitting circuit. In some implementations the receiving circuit can be configured to receive from one of the one or more entities an access response message establishing the link and including a second identifier associated with the entity, the second identifier including the first identifier combined with an additional identifier. The receiving circuit can include one or more of the antenna 716 (FIG. 7), the receiver 712 (FIG. 7), and the processor 704 (FIG. 7). In some implementations, means for receiving include the receiving circuit.

In some implementations, a shortened identifier assigned to devices can include a "virtual identifier." In some embodiments, a STA 106 can probe multiple APs 104a-104b before selecting an AP with which to associate. As each AP 104a-104b can have a different unique identifier, the communication network 100 can experience additional signaling when the STA 106 associates with an unknown AP.

For example, with respect to FIG. 1, a passenger STA 106 can be in range of, but not connected to, either the AP 104a or the AP 104b. In some embodiments, the STA 106 would specify a particular target AP in an association request 235. However, in an embodiment including virtual identifiers, the STA 106 can specify a virtual identifier, which can be common amongst many APs. Using this "shorthand" the STA 106 can request service from any APs associated with the virtual identifier. For example, the STA 106 can establish a link with the AP 104b by transmitting the virtual identifier or the actual identifier of the AP 104b. Determining the actual identifier for the AP 104b can require additional signaling, and can therefore delay link establishment. Instead, the STA 106 can specify a virtual identifier to establish the link.

Assignment the virtual identifier can be performed in a similar fashion as described above in reference to FIG. 10. The virtual identifier can be a virtual MAC identifier. A virtual identifier can be a SSID or can be mapped to a specific SSID. In some implementations, the virtual identifier represents a BSS. The virtual identifier can be common for all devices associated with a wireless communication system. For example, all APs for a given provider can be assigned the same virtual identifier.

In one embodiment, the AP 104 can transmit a packet to the STAs 106. The packet can include the virtual identifier corresponding to the AP 104. For example, the packet can include the virtual identifier in the header field of the packet. In some embodiments, a BSSID can be specified in a header, such as a control header, of each packet. A virtual identifier can include fewer bits than a BSSID. Accordingly, a smaller packet can be transmitted. Smaller packets can be transmitted and processed more quickly thereby reducing the time to process the packet. Furthermore, if the virtual identifier is transmitted in a control header field of each packet, this information is made available to STAs 106 that are attempting to establish a link with the transmitting AP 104. In addition to including a virtual identifier in a header field, an authentication challenge value (e.g., anonce) can also be included in a header field, such as a control header. This additional information can be used in conjunction with the virtual identifier to setup a link with the AP 104.

At the STAs 106, a virtual identifier can be assigned as described above. The virtual identifier can be a SSID. The virtual identifier assigned can be a homogeneous extended SSID. When the STA 106 receives a packet including the virtual identifier, it can determine an address associated with the virtual identifier. In some implementations, the STAs 106 can receive the virtual identifier by passively scanning for the packets. The packet received can be transmitted by an AP 104 and received by a STA 106. The packet received can be an uplink packet or a downlink packet. For example, the STA 106 can use a to-DS/from-DS indication in a control header to determine if the packet is an uplink or a downlink packet. The packet can be a packet addressed to the STA 106 or a packet addressed for another device.

The STA 106 can determine a physical address based on the virtual identifier by extracting the virtual identifier from the packet. In some implementations, STA 106 can determine the address by performing a look up of a permanent address based on the virtual identifier. For example, the STA 106 can include the memory 706 (FIG. 7) which can contain a table of information. The table of information can include a mapping of virtual identifiers to physical addresses. Additional information, such as location data, can also be used to perform the look up of an address associated with the virtual identifier. Backhaul message exchanges can also be used to determine the address associated with the virtual identifier.

Once the address is determined, the STA 106 can transmit an association request 230 addressed to the AP 104 at the determined physical address. In some implementations, the association request 230 can include CSMA signaling. The STA 106 can transmit the association request 230 to the determined address by including the determined address in a packet header. The AP 104 can respond to the association request 230 with an association response 240.

Figure 11:
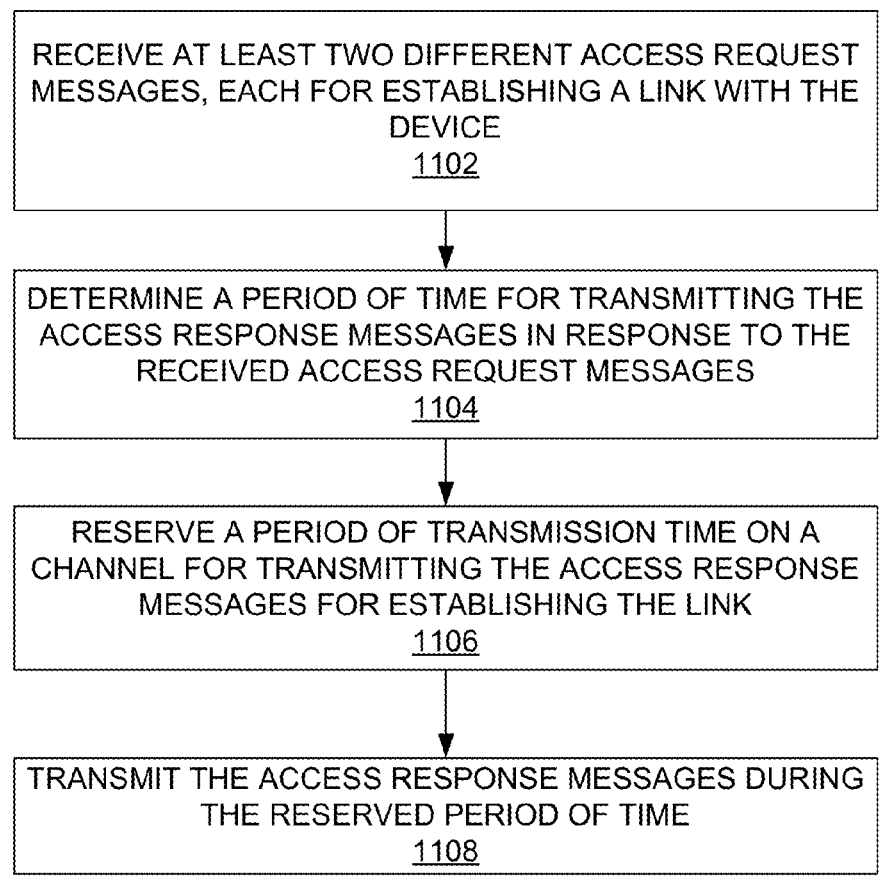
FIG. 11 shows a flowchart for another exemplary method of wireless communication that can be employed within the wireless communication system of FIG. 1.

FIG. 11 shows a flowchart for another method of wireless communication. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

First, at block 1102, the AP 104 receives at least two different access request messages, each for establishing a link with the device. In one implementation, the AP 104 receives the access request messages wirelessly, for example, via the antenna 716 (FIG. 7) coupled with the receiver 712 (FIG. 7). In various embodiments, the AP 104 can distinguish the access request messages by the source of the message, by the type of access requested, or other values included in the access request message. The AP 104 can reply to each access request message with a corresponding access response message transmission.

For example, with reference to FIG. 2, the AP 104 can receive access request messages (e.g., probe requests 210) transmitted from STAs 106. The AP 104 can be configured to transmit access response messages (e.g., probe responses 215) during specified transmit windows 250. In some implementations, the transmit window 250 can allow only one access response message to be transmitted. Accordingly, the AP 104 can delay sending access response messages as the AP 104 waits for each window 250. In some implementations, the AP 104 can also be configured to request a contention free period (e.g., clear to send) before transmitting the access response message. While this can reduce signal collisions at the AP 104, this process can introduce delay for processing other messages (e.g., other access request messages).

Next, at block 1104, the AP 104 determines a period of time for transmitting access response messages in response to the received access request messages. The determination can be a calculation based on the number of pending access request messages and/or an average transmission time for the AP 104. The determination can also consider transmission rates, transmission power, date, time of day, proximity to other APs, or other factors that influence the speed and/or reliability of a transmission. The determination can be performed by the processor 704 (FIG. 7) and/or the transmitter 710 (FIG. 7). The determination can be dynamically triggered. For example, during low volume periods, the resource cost of determining a window can exceed any benefit gained from batch transmission. Accordingly, the AP 104 can implement in a non-windowed transmission scheme.

One example determination includes identifying a number of received access request messages. The determination can also include identifying a number of pending access response messages. At one end of a spectrum, there may be no pending responses for the number of received access request messages. In such a scenario, the AP 104 has not yet processed the access requests. At the other end of the spectrum, the number of pending responses can equal the number of received requests. In such a scenario, all received requests have a pending response. Thus, the period of time can be generated based on the identified number of received access request messages and pending access responses. For example, if the generated period of time is greater than a maximum period of time, the period of time can be identified as the maximum period of time. This can be desirable in implementations where a transmitting device would like to contain the batch to an upper limit.

The number of pending responses can be used to calculate the period. For example, the number of pending responses can be multiplied by an average transmit time to determine the period for sending the responses. The average can be a static value (e.g., stored in the memory 706 (FIG. 7)). The average can be determined based on transmissions from the device (e.g., calculated over time based on transmissions from the device). In such implementations, the determined period of time can be tailored to the specific operational characteristics of the device.

Then, at block 1106, the AP 104 reserves the period of transmission time on a channel for transmitting the access response messages for establishing the link. The reservation is based at least in part on the determined period. This period of time represents the period of transmission time that can be used to transmit pending access response messages, in a single transmit opportunity. The reservation can be achieved by transmitting a clear to send message. The reservation can be achieved by setting a value coupled with the processor to control signaling for the device.

Subsequently, at block 1108, the AP 104 transmits the access response messages are transmitted during the reserved period of time. The AP 104 can transmit the access response messages wirelessly. The AP 104 can include the access response messages in a probe response 215. In some implementations, the transmitting can be configured to include an interframe space between each access response message. The interframe space can be configured to be as short as possible such that each access response message is discrete, but unnecessary delay in transmission is avoided. The interframe space can be, for example, 16 microseconds or less (e.g., 12 microseconds, 11 microseconds, 5 microseconds, or 2 microseconds). In some implementations, the transmitted access response message can include multiple access responses and be broadcast to multiple devices.

In some implementations, transmitting can include waiting for an acknowledgment of a first access response message prior to transmitting a subsequent access response message. Failover and retry transmission methods can be incorporated without departing from the scope of the present disclosure. The access response message can include parameters that a receiving device can use to establish a link with the transmitting device. The transmitting can also incorporate one or more of the methods described herein to further expedite initial link setup.

In an embodiment, the method shown in FIG. 11 can be implemented in another exemplary wireless communication device that can include a receiving circuit, a determining circuit, a reserving circuit, and a transmitting circuit. Those skilled in the art will appreciate that a wireless device may have more components than the simplified wireless device described herein. The wireless device described herein includes only those components useful for describing some prominent features of implementations within the scope of the claims.

The receiving circuit can be configured to receive at least two different access request messages each for establishing a link with the wireless communication device. The receiving circuit can include one or more of the antenna 716 (FIG. 7), the receiver 712 (FIG. 7), and the DSP 720 (FIG. 7). In some implementations, means for receiving can include the receiving circuit.

The determining circuit can be configured to determine a period of time for transmitting access response messages in response to the received access request messages. The determining circuit can include one or more of the memory 706 (FIG. 7), the processor 704 (FIG. 7), and a switch. Means for determining, in some implementations, can include the determining circuit.

The reserving circuit can be configured to reserve a period of transmission time on a channel for transmitting the access response messages for establishing the link, the reservation based at least in part on the determined period of time. The reserving circuit can include one or more of the memory 706 (FIG. 7), the processor 704 (FIG. 7), the transmitter 710 (FIG. 7), and the DSP 720 (FIG. 7). Means for reserving, in some implementation, can include the reserving circuit.

The transmitting circuit can be configured to transmit the access response messages during the reserved period of time. The transmitting circuit can include one or more of the transmitter 710 (FIG. 7), the antenna 716 (FIG. 7), a frequency generator, an amplifier, the processor 704 (FIG. 7), and a power source. Means for transmitting, in some implementations, can include the transmitting circuit.

Figure 12:
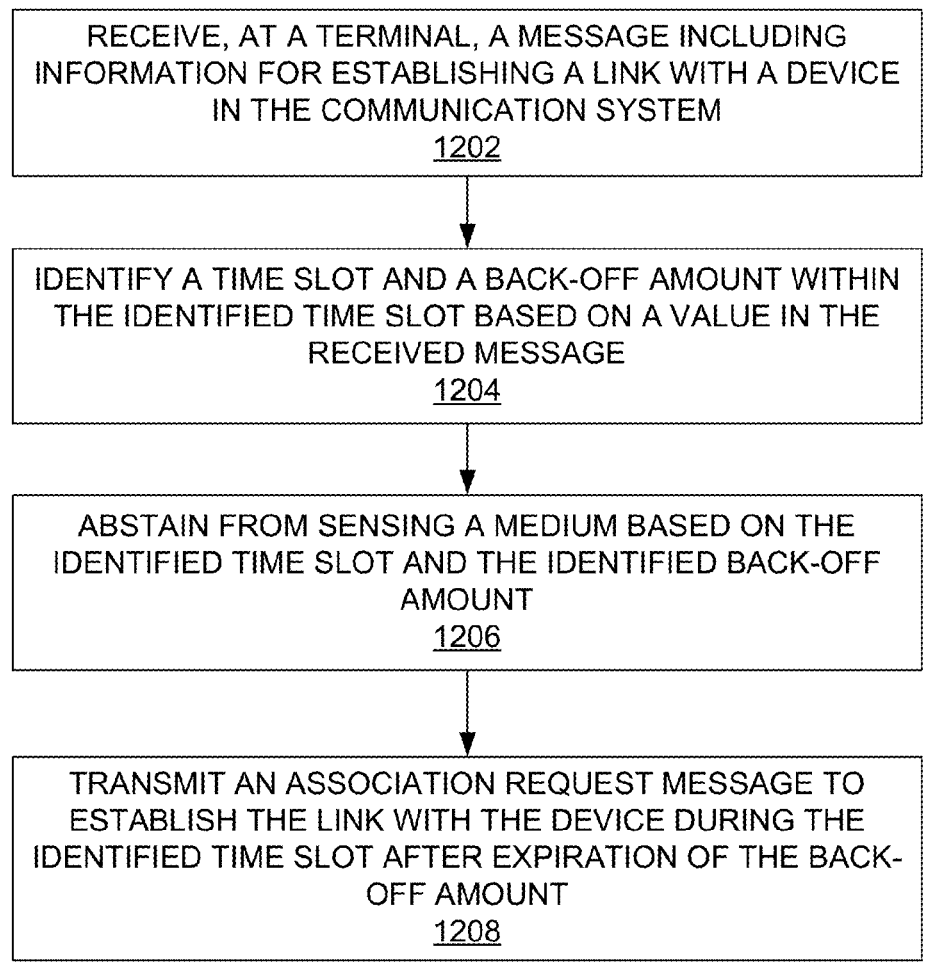
FIG. 12 shows a flowchart for another exemplary method of wireless communication that can be employed within the wireless communication system of FIG. 1.

FIG. 12 shows a flowchart for another exemplary method of wireless communication that can be employed within the wireless communication system 100 of FIG. 1. The illustrated method can reduce signaling during link setup in a wireless communication system. The method can be implemented in whole or in part by the STAs 106 described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

First, at block 1202, a terminal receives a message including information for establishing a link with an access point. For example, a STA 106 can receive a beacon 205 from the AP 104. In some implementations, the received message can be a probe response 215. The receiving can include additional message processing to identify the content of the received message.

For example, with reference to FIG. 1, as the train 120 arrives, the STAs 106 can receive the beacon 205 from AP 104*a*. Each STA 106 can determine that AP 104*a* is suitable and can immediately respond to the beacon 205 with association request messages 230. This can cause a surge in traffic for AP 104*a*. The traffic surge can cause collisions thereby delaying initial link setup.

Next, at block 1204, the STAs 106 identify a time slot and a back-off amount within the identified time slot. The identification can be based on a value included in the received message. For example, the value in the received message can indicate the time slot and/or back-off amount. In some implementations, the value can be used to generate time slot and/or back-off amount. For example, the value can be a random seed value which can be used to generate a random time slot and/or back-off amount.

By identifying a time slot to transmit, all STAs 106 select one time slot for transmission. This can spread the transmissions over multiple time slots, but where the number of STAs 106 is greater than the number of available time slots, controlling when each STA 106 assigned to the same time slot transmits can improve efficiency. For example, consider the implementation where a first and a second STA 106 are assigned a time slot. Without a back-off within the time slot, as soon as the time slot arrives, multiple STAs 106 may attempt a transmission. Simultaneous transmissions can introduce additional processing requirements at the AP 104. Consider, then, the case where the first STA 106 has no back-off and the second STA 106 has a 2 millisecond back-off. In this case, the AP 104 will receive the first transmission and then 2 milliseconds later receive the second transmission. This delay can be sufficient to avoid collision of the two requests thereby reducing the amount of time to process each transmission.

In some implementations, the value can indicate a window of time during which access request messages will be received by the AP 104. This allows the AP 104*a* to devote resources to other processing, such as processing data for previously attached STAs 106, during a controlled period of time. This also allows the AP 104*a* to focus resources on access requests during the specified period of time.

Then, at block 1206, the STAs 106 abstain from sensing the medium for a period of time based on the identified time slot and the identified back-off amount. For example, with reference to FIG. 2, STAs 106 do not immediately transmit association requests 230. Instead, each STA 106 selects a random interval to wait before transmitting delayed association requests 235. Accordingly, signaling between the STAs 106 and the AP 104 can be can spread over time, thereby reducing the load on the AP 104 and the communication network.

In some embodiments, the random interval can be selected from a range of intervals that provide an efficiency gain. For example, if the interval exceeds the wait time expected if all STAs 106 sensed the medium simultaneously, the benefit may be limited. The STAs 106 can select the random interval based on information included in the received signal. For instance, the AP 104 can specify a maximum value in a field of the signal. The STAs 106 can be configured to extract this value and use it in selection. Selection can include choosing a value between zero and the specified maximum value.

Subsequently, at block 1208, the STA 106 transmits an association request message 235 during the identified time slot after expiration of the back-off amount. In an embodiment, the STA 106 can use carrier sense multiple access (CSMA).

In an embodiment, the method shown in FIG. 12 can be implemented in another wireless communication device that can include a receiving circuit, a selecting circuit, and an association circuit. Those skilled in the art will appreciate that a wireless device may have more components than the simplified wireless device described herein. The wireless device described herein includes only those components useful for describing some prominent features of implementations within the scope of the claims.

In some implementations, the receiving circuit can be configured to receive a message including information for establishing a link with the wireless communication system from a device configured to provide the link. The receiving circuit can include one or more of the antenna 716 (FIG. 7), the receiver 712 (FIG. 7), and the DSP 720 (FIG. 7). In some wireless communication STAs 106, means for receiving can include the receiving circuit.

The selecting circuit can be configured to identify a time slot and a back-off amount within the identified time slot based on a value included in the received message. The selecting circuit can include one or more of the processor 704 (FIG. 7) and the memory 706 (FIG. 7). In some implementations, means for selecting can include the selecting circuit.

The association circuit can be configured to abstain from sensing a medium for the device based on the identified time slot and the identified back-off amount. The association circuit can be configured to transmit an association request message to establish the link with the device during the identified time slot after expiration of the back-off amount. The association circuit can include the antenna 716 (FIG. 7), the transmitter 710 (FIG. 7), a timer, and the processor 704 (FIG. 7). Some wireless communication STAs 106 can include means for establishing the link which can include the association circuit.

Figure 13:
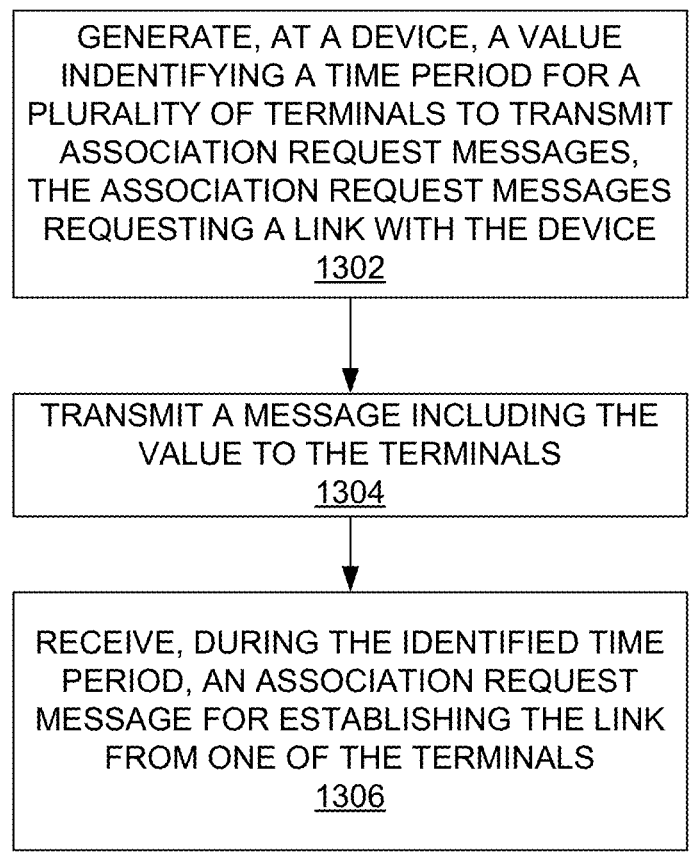
FIG. 13 shows a flowchart for another exemplary method of wireless communication that can be employed within the wireless communication system of FIG. 1.

FIG. 13 shows a flowchart for another exemplary method of wireless communication that can be employed within the wireless communication system 100 of FIG. 1. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

First, at block 1302, the AP 104 generates a value identifying a time period during which the STAs 106 should transmit association requests 235. The value can include a random seed value which the STAs 106 can use to identify a time slot and back-off amount within the identified time slot, as discussed above with respect to FIG. 12. The value can identify a contention window for receiving association requests 235 at the device. The contention window can be an absolute window wherein association requests 230 can be received. The contention window can be a relative window during which the association requests can be received. In one implementation, the AP 104 determines the contention window for accepting association requests 235. Accordingly, the AP 104 can devote resources to other processing, such as processing data for attached devices, during a controlled period of time. In some implementations, the AP 104 can ignore association requests 230 received outside the identified time.

The identification of the time period can be based on a variety of factors. In some implementations, where the value includes a random seed value, the value can be generated based on, for example, an identifier associated with the AP 104 (e.g., a MAC identifier, SSID, IP address, equipment identifier, etc.).

In implementations where the value identifies a contention window, the AP 104 can determine the contention window based on existing or predicted factors. The factors that can be considered include one or more of the size of the network, the number of devices accessing the network or AP, the load of the network or AP, a particular service level associated with the STA 106, and the like. The prediction can be based on the time of day. For example, more STAs 106 may travel through the BSA 107a during a commuting rush hour than during the middle of the night. Accordingly, the AP 104 can dynamically adjust the contention window. Predicted factors can be based on historical values for the network or for a specific AP. For example, the factors can be stored in the memory 706 (FIG. 7) and the processor 704 (FIG. 7) can calculate a contention window based on the stored factor values (e.g., regression, derivation, average, mean, moving average).

Next, at block 1304, the AP 104 transmits a message including the generated value to the STAs 106. The message can include the probe response 215. The message can include the beacon 205. The value can be encoded in a header of the message. The value can be encoded in the body of the message. The transmission can include a wireless transmission of the message to a specific STA 106 or a wireless broadcast of the message. In some implementations, transmitting the message can include setting or starting a timer to identify the period of time. The timer can be used to identify another period of time until the start of the identified period of time. In some implementations, the timer can be used to directly identify the period of time.

Then, at block 1306, the AP 104 receives an association request 235 from a STA 106, during the identified time period. As discussed above, the AP 104 can ignore association requests 235 received outside the contention window. In some implementations, the AP 104 can accept association requests 235 received outside the contention window, but with lower priority than other messages. Accordingly, when the AP 104a has available resources, it can process the association request 235. In some implementations, the AP 104a can transmit a message indicating the association request 235 was transmitted outside the identified time period.

In an embodiment, the method shown in FIG. 13 can be implemented in another exemplary wireless communication device that can include a determining circuit, a transmitting circuit, and a receiving circuit. Those skilled in the art will appreciate that a wireless device may have more components than the simplified wireless device described herein. The wireless device described herein includes only those components useful for describing some prominent features of implementations within the scope of the claims.

The determining circuit can be configured to generate a value identifying a time period for STAs 106 to transmitting association requests to establish a link with the wireless communication system via the wireless communication device. The determining circuit can include one or more of the processor 704 (FIG. 7) and the memory 706 (FIG. 7). In some implementations, means for determining can include the determining circuit.

The transmitting circuit configured to transmit a message including the value to the STAs 106. The transmitting circuit can include one or more of the antenna 716 (FIG. 7), the transmitter 710 (FIG. 7), a timer, and the processor 704 (FIG. 7). In some implementations, means for transmitting can include the transmitting circuit.

The receiving circuit can be configured to receive, during the identified time period, an association request 235 for establishing the link from a STA 106 to establish the link with the STA 106. The receiving circuit can include one or more of the antenna 716 (FIG. 7), the receiver 712 (FIG. 7), and the DSP 720 (FIG. 7). Means for receiving, in some implementations, can include the receiving circuit.

Figure 14:
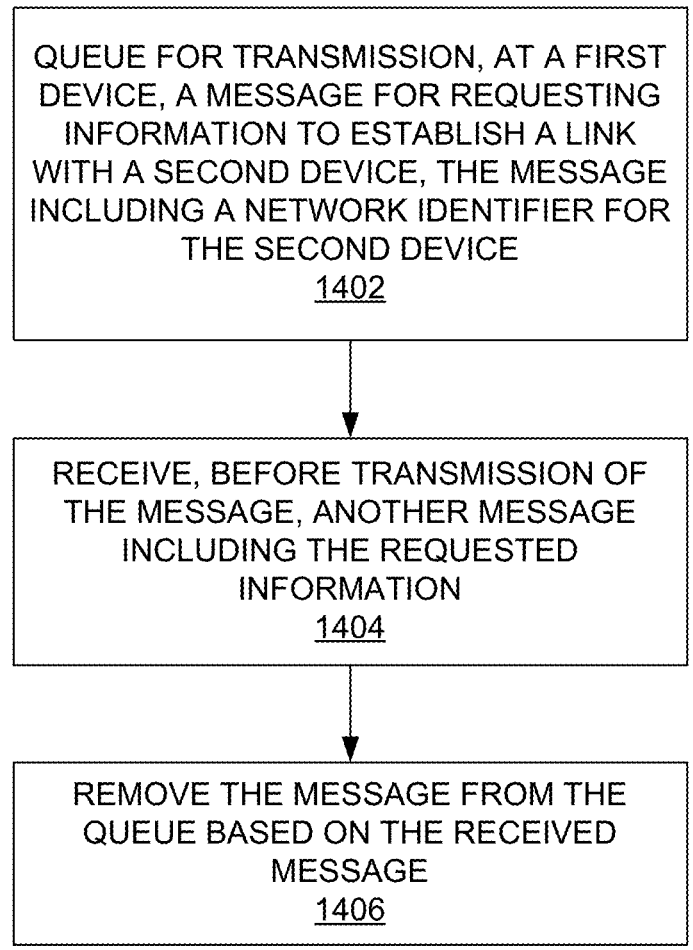
FIG. 14 shows a flowchart for another exemplary method of wireless communication that can be employed within the wireless communication system of FIG. 1.

FIG. 14 shows a flowchart for another exemplary method of wireless communication that can be employed within the wireless communication system 100 of FIG. 1. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

As discussed above with respect to FIG. 2, a STA 106 can transmit an access request such as, for example, a probe request 210 or an association request 230. As part of the process of transmitting the access request, the STA 106 can first generate the message. In some implementations, the STA 106 does not immediately transmit the message. Instead, the STA 106 can queue the message for transmission, for example in the memory 706 (FIG. 7) or a transmit buffer. While the message is in the queue, the STA 106 may receive a message including the information expected in response to the queued message, for example, a probe response 215 sent to another STA 106 or a beacon 205. In this case, the STA 106 can achieve faster link setup by using the detected message rather than transmitting an access request message, waiting for a response, and then beginning association procedures.

Conversely, the AP 104 can generate and queue a response to a probe request 210 or access network query protocol request from the STA 106. While the response is queued, the STA 106 may passively identify the information for associating with an AP 104. For example, the STA 106 can passively scan beacons 206, probe responses 215 sent to other STAs 106, and the like. In some cases, the STA may transmit an association request 230 to the AP 104 while the probe response 215 or the access network query protocol response is still in the queue. Accordingly, the AP 104 can remove the response from the queue. By removing this response from the queue, the AP 104 can reduce unneeded response transmissions.

First, at block 1402, the STA 106 queues a message for requesting information to establish a link with the AP 104.

The message includes a network identifier for the second device. The message can be, for example, a probe request 210 or an access network query protocol request when the method is implemented in the STA 106. When the method is implemented in the AP 106, the message can be, for example, a probe response 215 or an access network query protocol response. The message can include a network identifier (e.g., SSID, BSSID, virtual ID, network domain ID) of the second device which the first device is trying to establish a link with. A network domain ID can be an identifier that indicates a network domain that an access point belongs. The AP 104 can belong to multiple network domains. The STA 106 can specify the network domain ID associated with APs that it would like to associate. Thus, the network identifier can be used to identify a specific AP (e.g., SSID) or a generic class APs (e.g., virtual ID, network domain ID) for association.

Next, at block 1404, another message including the requested information is received before transmission of the message. The message received can be passively detected. Transmission of the message can have been caused by an access request message transmitted from a different device. The message can be addressed to the STA 106 or addressed to another device. The network identifier in the received message can be the same as the network identifier of the queued message. The network identifier can be extracted from the received message and stored in the memory 706 (FIG. 7) for further processing as described herein.

Then, at block 1406, the message is removed from the queue based on the received message. For example, the transmitter 710 (FIG. 7) can include a check circuit that obtains the network identifier from the received message from the memory 706 (FIG. 7). The check circuit can alter the transmission of the access message by, for example, removing the access request message from the transmission queue. In some implementations, the check circuit performs the check as each message is about to be transmitted. In some implementations, the check circuit can perform a continuous check of all items in the queue. By avoiding the transmission of the message, the implementing device can expedite the setup of an initial link. Furthermore, avoiding transmission reduces the number of messages transmitted to the AP 104. As discussed above, this helps reduce the load on the AP 104 thereby providing some additional enhancements to the initial link setup process as well as corresponding reductions in resource (e.g., power, processing, bandwidth, memory) utilization.

As a further example, with respect to the FIG. 1, the STAs 106a and 106b can be configured to send a probe request 210 or an access network query protocol request as a broadcast message. The broadcast message can be received at many APs, such as the APs 104a-104b. All the APs that receive the broadcast message can respond by sending individual probe responses 215 or access network query protocol responses. All APs responding can cause network congestion. To avoid network congestion, when the STA 106a prepares a request, it can queue the request message. While the STA 106a is waiting to transmit the request, the STA 106b can receive a probe response 215, access network query protocol response, or beacon 205 frame transmitted from the AP 104a. The STA 106a can passively detect the message sent to the STA 106b. If the information in the message is sufficient to permit association with the AP 104a, the STA 106a can be configured to cancel the pending request and thus save the air medium from extraneous transmission, power that can be utilized to effect the transmission, and processing time associated with the transmission.

As another example, with respect to FIG. 1, the APs 104a and 104b can queue responses (e.g., probe response 215 or access network query protocol response) to a request (e.g., probe request 210 or access network query protocol request) sent by the STA 106a. The AP 104a may transmit the response, which the STA 106a can receive. The STA 106a can transmit an association request 230 to the AP 104a. At this stage, the queued responses at the other AP 104b may not be useful to the STA 106a, because the STA 106a has already associated with the AP 104a. To prevent the other APs 104b from unnecessarily transmitting the queued response, and thus loading the wireless network, the AP 104b can be configured to passively listen to access request messages from STAs 106. When the AP 104b detects that the queued response is no longer relevant, it can cancel transmission.

In an embodiment, the method shown in FIG. 14 can be implemented in another exemplary wireless communication device that can include a queuing circuit, a receiving circuit, and a removing circuit. Those skilled in the art will appreciate that a wireless device may have more components than the simplified wireless device described herein. The wireless device described herein includes only those components useful for describing some prominent features of implementations within the scope of the claims.

The queuing circuit can be configured to queue a message for requesting information to establish a link with a second device for transmission, the message including a network identifier for the second device. The queuing circuit can include one or more of the memory 706 (FIG. 7), the transmitter 710 (FIG. 7), and the DSP 720 (FIG. 7). Means for queuing, in some implementations, can include the queuing circuit.

The receiving circuit can be configured to receive, before transmission of the message, another message including the requested information. The receiving circuit can include one or more of the antenna 716 (FIG. 7), the receiver 712 (FIG. 7), the memory 706 (FIG. 7), and the DSP 720 (FIG. 7). In some implementations, means for receiving include the receiving circuit.

The removing circuit can be configured to remove the message from the queue based on the received message. The removing circuit can include one or more of a checking circuit, the processor 704 (FIG. 7), the memory 706 (FIG. 7), and the transmitter 710 (FIG. 7). In some implementations, means for removing can include the removing circuit.

Figure 15:
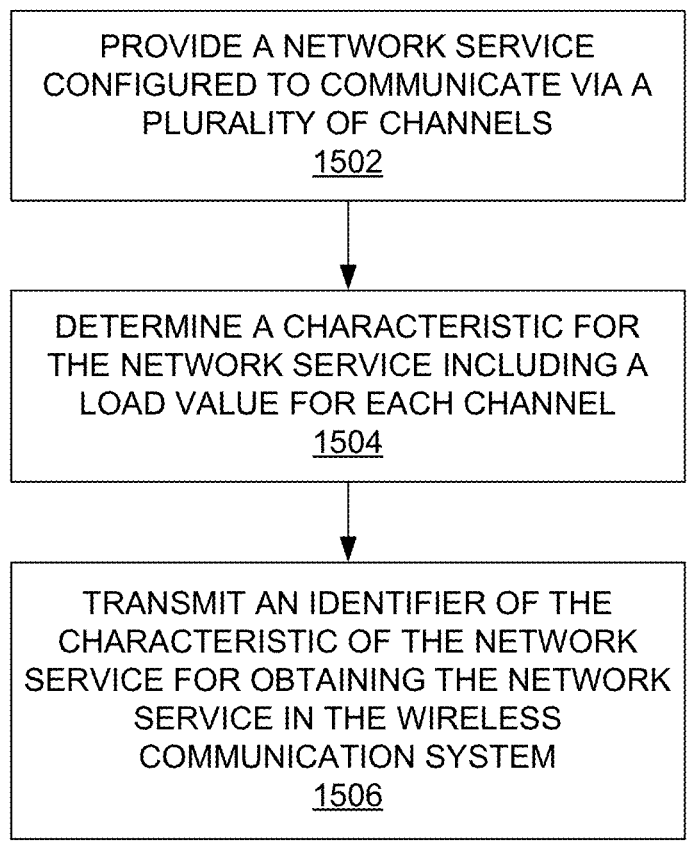
FIG. 15 shows a flowchart for another exemplary method of wireless communication that can be employed within the wireless communication system of FIG. 1.

FIG. 15 shows a flowchart for another exemplary method of wireless communication that can be employed within the wireless communication system 100 of FIG. 1. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

In various embodiments, the AP 104 can provide one or more channels for communication with STAs 106. In some implementations, each channel corresponds to a different frequency. As each channel can experience a different signal load, some channels can be busier than other channels. Accordingly, balancing the load on each channel can increase processing speed, for example by diverting traffic to underutilized (e.g., lower load) channels.

First, at block 1502, the AP 104 provides a network service configured to communicate via a plurality of channels. Next, at block 1504, the AP 104 determines a characteristic of the network service, including a load value for each of the plurality of channels. The load value can be based on one or more of: the number of connections for the channel, the activity via the channel (e.g., chatty signaling, long downloads, streaming data), and the like.

In an embodiment, the AP 104 can evaluate the characteristic at intervals, such as every 30 milliseconds. A timer can be included to establish the interval for load determination. The AP 104 can store the determined load values in the memory 706 (FIG. 7). In some embodiments, the AP 104 can identify an absolute load value for each channel. In some embodiments, the AP 104 can identify an average load value for each channel.

Then, at block 1504, the AP 104 transmits an identifier of the characteristic of the network service for obtaining the network service in the wireless communication system. The identifier can be included in a beacon 205. In some implementations, the identifier can be included in a header field of a message. In some implementations, the identifier can be included in the body of a message.

In an embodiment, the AP 104 can transmit a second value indicating that no further associations with the network service are being accepted. The second value can indicate association availability on a per channel basis or for the entire network service. The second value can be a single bit. In some implementations, the second value can include multiple bits. The transmitting can include receiving information from the processor 704 (FIG. 7) performing the determining. The transmitting can include encoding the information. The transmitting can further include wirelessly transmitting the information via the antenna 716 (FIG. 7) associated with the transmitter 710 (FIG. 7).

In some implementations, the AP 104 can transmit other information to facilitate selection of an AP by the STAs 106. The additional information can be sent in conjunction with the above described load information or in place of the load information. One example of the additional information is an identifier of one or more other APs. With reference to FIG. 1, the APs 104*a* and 104*b* can be operated by the same service provider. In an embodiment, the AP 104*a* can transmit an identifier, such as a basic service set identifier or MAC address, of AP 104*b*. The most recent authentication challenge value associated with the AP 104*a* or the AP 104*b* can also be transmitted. The AP 104*a* can communicate with AP 104*b* via a backhaul to exchange identifiers, authentication challenge values (e.g., anonce), and other information. A receiving STA 106 can associate with a selected AP from the set of identified APs.

As described thus far, the characteristic information regarding network services provided by a transmitting device are provided. However, in some implementations, it can be desirable to provide characteristic information for another service.

Referring again to FIG. 1, a first AP 104*a* can have a nearby or neighboring AP 104*b*. The APs 104*a* and 104*b* can be known to each other, for example via a pre-determined configuration provided by the network operator. The configuration can be provided at manufacture time or install time. The configuration can be stored in the memory 706 (FIG. 7) associated with the APs 104*a*-104*b*. The APs 104*a* and 104*b* can also discover each other through wireless communication. For example, in some implementations, it can be desirable for a STA 106 attempting to access AP 104*a* to also know of other, nearby APs. The STA 106 can determine which AP to associate with. For example, if the AP 104*a* is under a heavy load, the STA 106 can be configured to access a different AP nearby, such as the AP 104*b*. Accordingly, the STA 106 has more control over which AP to access and can avoid delays that can be incurred by associating with a heavily loaded AP, preferring, instead, to associate with a less busy neighboring AP. In this way, the time to associate with an AP can be reduced.

The method can include obtaining another characteristic of another network service. As discussed above, the identity of the network service can be configured at the AP 104*a* and/or the AP 104*b* (e.g., a static configuration value). The AP 104*a* and/or the AP 104*b* can also use signaling to both identify the other network service and characteristics of the network service. Characteristics can include network identifier, network domain identifier, channels provided by the network and load for the channels provided. The identification can include backhaul message exchange between the network, the network operator's systems, and the neighboring network. The identification can be performed according to a schedule (e.g., every minute, every hour, everyday). The identification can be performed through a notification from the neighboring network (e.g., push or subscription notification).

The method can also include transmitting the neighboring network characteristic. In some implementations, more than one characteristic can be transmitted. For example, the identifier, channel and channel load can be transmitted as associated data elements. In some implementations, an information element of a beacon 205 can be used to transmit the characteristic information. An information element in a probe response 215 can also be used to transmit the characteristic information. An exemplary neighbor network element is shown and described in further detail below in reference to FIG. 6. As described above, the AP 104*a* and/or the AP 104*b* can also transmit information regarding channels provided by the AP 104*a* and/or the AP 104*b* and the associated load values. In some implementations, characteristics for more than one neighboring network can be transmitted. Where characteristics for multiple neighboring network services are transmitted, the message including the identifier can include a value indicating the number of neighbors included in the message.

As an example, the transmission can include a neighbor network element. The neighbor network element can include the information about other networks in the vicinity of the AP transmitting the message. The neighbor network element can be included in a beacon 205 or probe response 215 to enable STAs to determine if another AP should be considered. The neighbor network element can include one or more of the following fields: BSSID carrying the BSSID of the neighboring network; channel carrying the operating channel of neighboring network; loading carrying the load factor for the operating channel; SSID carrying the SSID of the neighboring network; number of network IDs carrying the number of network domain IDs the neighboring network belongs to; and network ID carrying the network ID and/or network domain identifier of the neighboring network. More than one instance of each field listed above can be included in the message to allow multiple channels and multiple neighbors to be identified.

In an embodiment, the method shown in FIG. 15 can be implemented in another exemplary wireless communication device that can include a providing circuit, a determining circuit, and a transmitting circuit. Those skilled in the art will appreciate that a wireless device may have more components than the simplified wireless device described herein. The wireless device described herein includes only those components useful for describing some prominent features of implementations within the scope of the claims.

The providing circuit can be configured to provide a network service configured to communicate via a plurality of channels. The providing circuit can include one or more of the antenna 716 (FIG. 7), the DSP 720 (FIG. 7), and a transceiver. In some implementations, means for providing can include the providing circuit.

The determining circuit can be configured to determine a characteristic of the network service including a load value for each of the plurality of channels. The determining circuit can include one or more of the memory 706 (FIG. 7), the processor 704 (FIG. 7), and a timer. Means for determining can, in some implementations, include the determining circuit.

Some wireless communication devices can include the transmitting circuit which is configured to transmit an identifier of the characteristic of the network service for obtaining the network service in the wireless communication system. The transmitting circuit can include one or more of the antenna 716 (FIG. 7), the transmitter 710 (FIG. 7), and the processor 704 (FIG. 7). Means for transmitting can include the transmitting circuit.

Figure 16:
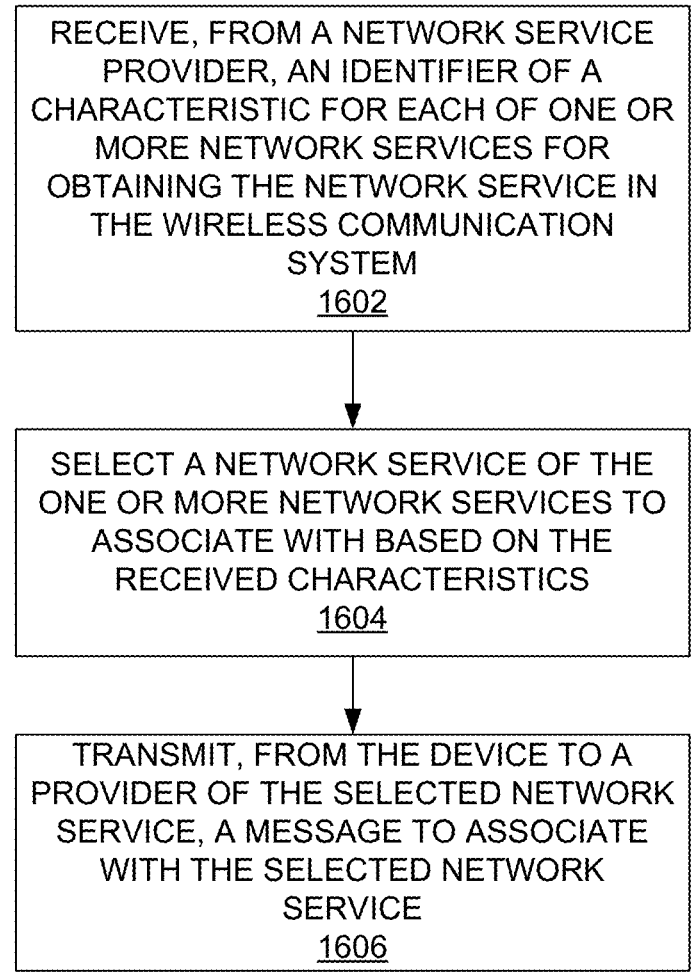
FIG. 16 shows a flowchart for another exemplary method of wireless communication that can be employed within the wireless communication system of FIG. 1.

FIG. 16 shows a flowchart for another exemplary method of wireless communication that can be employed within the wireless communication system 100 of FIG. 1. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

First, at block 1602, a STA 106 receives an identifier of a characteristic for each of one or more network services for obtaining the network service in the wireless communication system. The identifier can be transmitted by the AP 104, as discussed above with respect to FIG. 15. The STA 106 can extract one or more load values from the received identifier. The STA 106 can store the extracted load value(s) and the associated channel in the memory 706 (FIG. 7). The identifier can be received via a beacon 205.

Next, at block 1604, the STA 106 selects a network service of the one or more network services for association based on the received characteristics. The STA 106 can choose the network service (e.g., channel) with the lowest load value. The STA 106 can choose a network service based on a combination of the load value and the frequency of the associated network service. For example, certain applications can perform better under certain conditions. Accordingly, the STA 106 can refuse network services that may not provide adequate bandwidth for the application requesting network access and can select from the remaining network services based on the load values. If the identifier indicates that a given channel is not accepting new associations, the STA 106 can exclude that channel from consideration. If the received characteristic includes an indicator that an AP is not accepting new associations, the STA 106 can initiate a new discovery sequence. For example, the STA 106 can receive a different beacon 205. In some implementations, the selected network service is stored in the memory 706 (FIG. 7).

Then, at block 1606, the STA 106 transmits a message to associate with the selected network service. For example, the transmitter 710 (FIG. 7) can obtain the selected provider information from the memory 706 (FIG. 7) location and initiate the association procedures. Because the network service is selected based in part on the characteristic of the network service, the associating device can select an idle network service to associate with. This can reduce the overall collisions of data at the provider of the service (e.g., AP).

In an embodiment, the method shown in FIG. 16 can be implemented in another exemplary wireless communication device that can include a receiving circuit, a selecting circuit, and an associating circuit. Those skilled in the art will appreciate that a wireless device may have more components than the simplified wireless device described herein. The wireless device described herein includes only those components useful for describing some prominent features of implementations within the scope of the claims.

The receiving circuit can be configured to receive, from a network service provider, an identifier of a characteristic for each of one or more network services for obtaining the network service in the wireless communication system. The receiving circuit can include one or more of the antenna 716 (FIG. 7), the DSP 720 (FIG. 7), the receiver 712 (FIG. 7), and the memory 706 (FIG. 7). In some wireless communication devices, means for receiving can include the receiving circuit.

The selecting circuit can be configured to select a network service of the one or more network services to associate with based on the received characteristics. The selecting circuit can include one or more of the processor 704 (FIG. 7), the memory 706 (FIG. 7), and a switch. Means for selecting can include the selecting circuit in some implementations.

The associating circuit can be configured to transmit, from the wireless communication device to a provider of the selected network service, a message to associate with the selected network service. The associating circuit can include the transmitter 710 (FIG. 7), the antenna 716 (FIG. 7), and the memory 706 (FIG. 7). Means for transmitting can include the associating circuit in some implementations.

Figure 17:
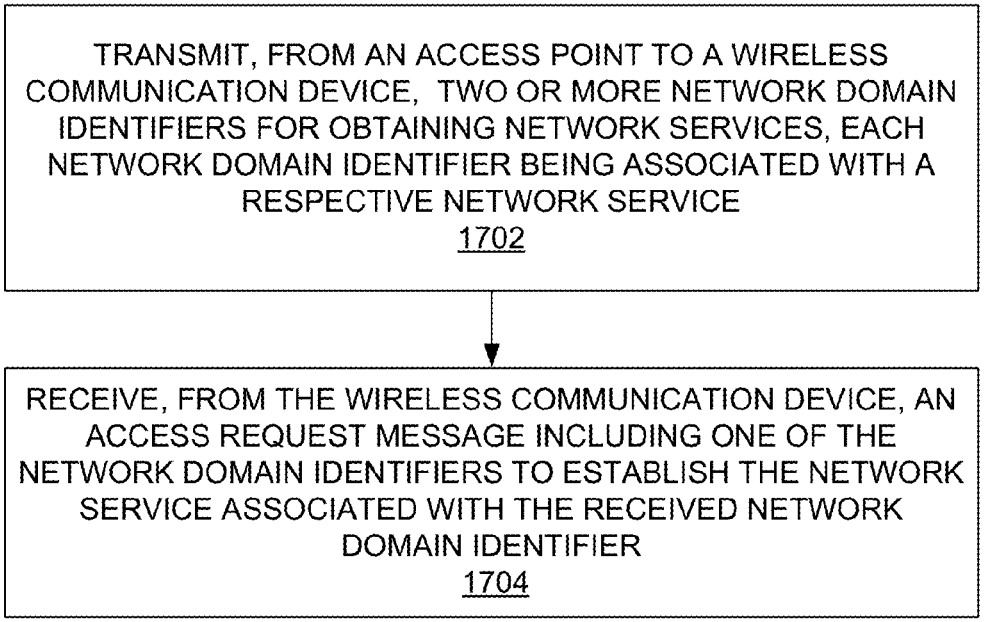
FIG. 17 shows a flowchart for another exemplary method of wireless communication that can be employed within the wireless communication system of FIG. 1.

FIG. 17 shows a flowchart for another exemplary method of wireless communication that can be employed within the wireless communication system 100 of FIG. 1. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

As discussed above with respect to FIG. 2, a network operator can associate one or more APs into a logical grouping. In some implementations, this logical grouping can be referred to as a network domain. An AP can be included in more than one network domain. For example, an AP can be associated with a first network domain grouping APs configured for multimedia communication and a second network domain grouping APs configured for video chat communication. Each network domain can be associated with a network domain identifier. An example network domain identifier element is shown and described in further detail in reference to FIG. 5.

First, at block 1702, the AP 104 can transmit two or more network domain identifiers for obtaining network services to one or more STAs 106. Each network domain identifier can be associated with a respective network service. For example, the AP 104 can transmit a beacon 205 including the network domain identifiers. Within the beacon 205, an information element can be used to provide the network domain identifier. In an embodiment, the AP 104 can transmit a probe response 215 including the network domain identifiers in response to a probe request 210 signal received from a STA 106. In some implementations, a network domain identifier included in the transmission from an AP 104 can identify a network domain to which the AP 104 is not a member. In such implementations, the AP 104 provides information about other network domains which can be located nearby thus expediting the wireless communication device discovering an appropriate network domain (e.g., providing a capability and/or service level of interest to the wireless communication device) to establish a link.

Next, at block 1704, the AP 104 can receive an access request message, including one of the network domain identifiers, from a STA 106. The AP 104 can use the access request message to determine whether or not to associate with the sender of the message. For example, if the message is received by an AP associated with the network domain identified in the access request message, the AP can initiate association with the wireless communication device that transmitted the access request.

In some implementations, one or more domain identifiers can be assigned to the AP 104. In an embodiment, the domain identifiers can be statically assigned at the time the AP 104 is manufactured or installed. In an embodiment, the domain identifiers can be dynamically assigned. For example, a network operator can transmit a message to the AP 140 identifying the network domain identifier for the AP 104. In an embodiment, backhaul messaging can be used to transmit the identifier(s). In some implementations, the assignment is stored in non-volatile memory.

In an embodiment, the method shown in FIG. 17 can be implemented in another exemplary wireless communication device that can include the transmitter 710 (FIG. 7) circuit, and the receiver 712 (FIG. 7) circuit. Those skilled in the art will appreciate that a wireless device may have more components than the simplified wireless device described herein. The wireless device described herein includes only those components useful for describing some prominent features of implementations within the scope of the claims.

The transmitter circuit can be configured to transmit from the device to a wireless communication device two or more network domain identifiers for obtaining network services, each network domain identifier being associated with a respective network service. The transmitter circuit can include one or more of the transmitter 710 (FIG. 7), the antenna 716 (FIG. 7), and the DSP 720 (FIG. 7). For example, the digital signal processor can obtain the network domain identifiers from the memory 706 (FIG. 7) and provide a representation of the network domain identifiers (e.g., included in a beacon 205 or probe response 215) to the transmitter for transmission via the antenna. In some wireless communication devices, means for transmitting can include the transmitter circuit.

The receiver circuit can be configured to receive from the wireless communication device at the device an access request message including one of the network domain identifiers to establish the network service associated with the received network domain identifier. The receiver circuit can include one or more of the antenna 716 (FIG. 7), the DSP 720 (FIG. 7), the receiver 712 (FIG. 7), and the memory 706 (FIG. 7). For example, the antenna can sense the access request signal and provide the sensed signal to the digital signal processor via the receiver for conversion into digital form. The converted signal can be stored in the memory 706 (FIG. 7) for further processing by the device such as described herein. In some wireless communication devices, means for receiving can include the receiver circuit.

Figure 18:
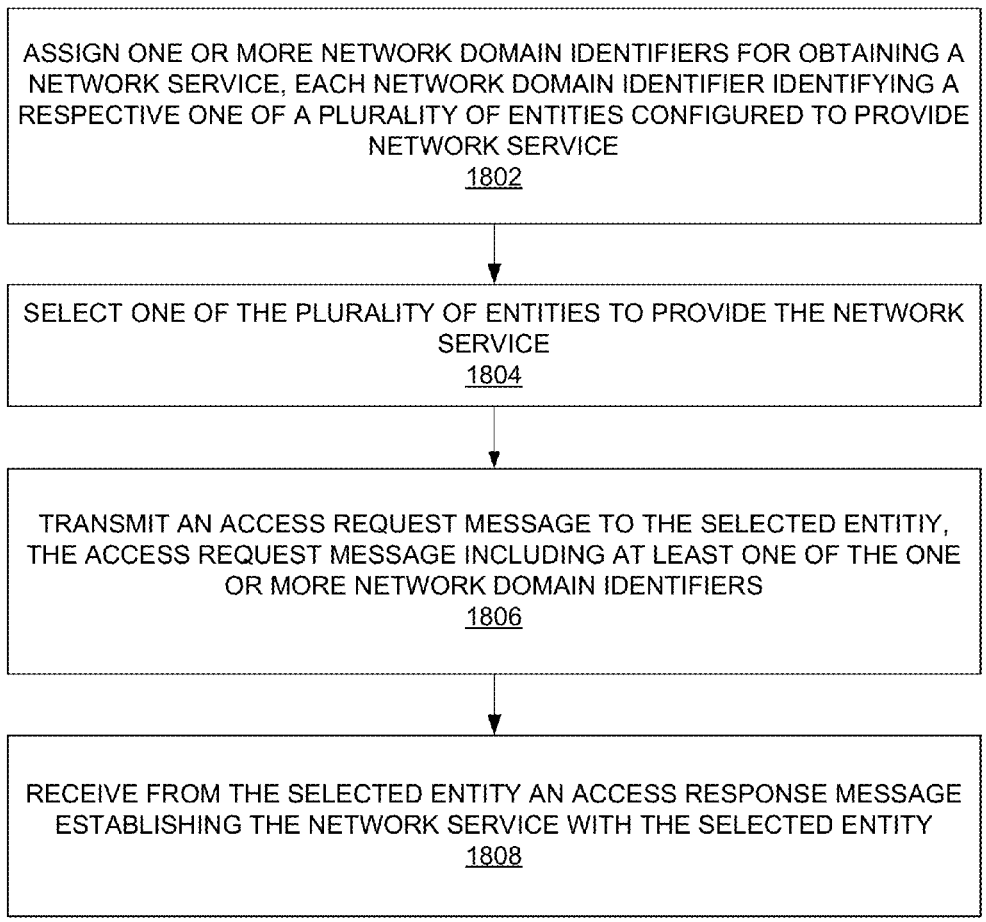
FIG. 18 shows a flowchart for another exemplary method of wireless communication that can be employed within the wireless communication system of FIG. 1.

FIG. 18 shows a flowchart for another exemplary method of wireless communication that can be employed within the wireless communication system 100 of FIG. 1. The illustrated method can reduce signaling during link setup in a wireless communication system. The method can be implemented in whole or in part by the devices described herein, such as the wireless device 702 shown in FIG. 7. Although the illustrated method is described herein with reference to the wireless communication system 100 discussed above with respect to FIG. 1, the communication exchange 200 discussed above with respect to FIG. 2, and the wireless device 702 discussed above with respect to FIG. 7, a person having ordinary skill in the art will appreciate that the illustrated method can be implemented by another device described herein, or any other suitable device. Although the illustrated method is described herein with reference to a particular order, in various embodiments, blocks herein may be performed in a different order, or omitted, and additional blocks may be added.

First, at block 1802, one or more network domain identifiers for obtaining a network service are assigned to a STA 106. Each network domain identifier identifies a respective one of a plurality of APs configured to provide a network service. In some implementations, the network domain identifiers can be pre-installed in the STA 106. In some implementations, the network domain identifiers can be provided to the STA 106 via over-the-air (OTA) provisioning. The STA 106 can use the assigned network domain identifiers to associate with the AP 104.

Next, at block 1804, the STA 106 selects one of the plurality of APs for association. The STA 106 can select an AP based on a capability such as radio access technology or expected bandwidth. In some implementations, the STA 106 can receive a beacon 205 from an AP including two or more network domain identifiers. The STA 106 can select the AP associated with an assigned network domain identifier and that is included in the received network domain identifiers.

For example, a device can include network domain identifiers for video and text messaging services. When the STA 106 prepares to send a text message, it can receive a beacon 205 from the AP 104 including domain identifiers for video, text, voice, and other network services. The STA 106 can be configured to obtain the text services from the AP 104 associated with the beacon 205, as it includes text network services. In some implementations, the AP 104 transmitting the beacon 205 can also provide the specified services. In some implementations, the AP 104 transmitting the beacon 205 can include an identifier of an AP that provides the identified services (e.g., a neighboring AP).

Then, at block 1806, the STA 106 transmits an access request message including at least one of the network domain identifiers to the selected AP. The access request message can be a probe request 210 including the network domain identifier. For example, the probe request 210 can include the network domain identifier in an information element.

Subsequently, at block 1808, the STA 106 receives an access response message from the selected AP. For example, the STA 106 can receive a probe response 215 from the AP 104 corresponding to one of the network domain identifiers included in the probe request 210. The probe response 215 can also include information that the STA 106 can use to associate with the identified AP 104.

In an embodiment, the method shown in FIG. 18 can be implemented in another exemplary wireless communication device that can include a storage circuit, a selection circuit, the transmitter 710 (FIG. 7) circuit, and the receiver 712 (FIG. 7) circuit. Those skilled in the art will appreciate that a wireless device may have more components than the simplified wireless device described herein. The wireless device described herein includes only those components useful for describing some prominent features of implementations within the scope of the claims.

The storage circuit can be configured to store one or more network domain identifiers for obtaining a network service, each network domain identifier identifying a respective one of a plurality of entities configured to provide network services. Each network domain identifier identifies a respective entity of a plurality of entities configured to provide a network service. The storage circuit can include one or more of the DSP 720 (FIG. 7) and the memory 706 (FIG. 7). In some wireless communication devices, means for storing can include the storage circuit.

The selection circuit can be configured to identify one of the plurality of entities to provide the network service. The selection circuit can include one or more of the memory 706 (FIG. 7), the processor 704 (FIG. 7), a comparator, and an arithmetic unit. In some wireless communication devices, means for identifying an entity can include the selection circuit.

The transmitter circuit can be configured to transmit an access request message to the identified entity, the access request message including at least one of the one or more network domain identifiers. The transmitter circuit can include one or more of the transmitter 710 (FIG. 7), the antenna 716 (FIG. 7), and the DSP 720 (FIG. 7). In some wireless communication devices, means for transmitting can include the transmitter circuit.

The receiver circuit can be configured to receive from the identified entity an access response message establishing the network service with the selected entity. The receiver circuit can include one or more of the antenna 716 (FIG. 7), the DSP 720 (FIG. 7), the receiver 712 (FIG. 7), and the memory 706 (FIG. 7). In some wireless communication devices, means for receiving can include the receiver circuit.

Exemplary Combinations

One or more of the devices and methods described herein can be combined to reduce signaling during link setup in a wireless communication system. Accordingly, a higher level of efficiency for implementation of a fast link set up process can be achieved. Although various exemplary combinations are described below, a person having ordinary skill in the art will appreciate that additional combinations are possible, and the combinations can be rearranged.

In one implementation, one or more embodiments described above with respect to the sections titled "Targeted Probe Requests, "Network Domains," and "Access Response Window," and with respect to FIGS. 9, 10, 11, 17, and 18, can be combined. For example, an access point can transmit at least first and second network domain identifiers. Each of the network domain identifiers can be associated with a respective network service. The network domain identifiers can have a first number of bits. The access point can receive, from a first device, an access request message for establishing the network service associated with at least one of the network domain identifiers. The access request message can include a third network domain identifier associated with a plurality of network services. The third network domain identifier can include a sequence of bits based on the first or second identifier. The bit length of the sequence of bits can be less than the first number of bits. The access point can broadcast, to a plurality of devices including the first device, an access response message. The access response message can establish a link with the first device, and can include the first identifier, in response to receiving the access request message.

As another example, a wireless communication device can receive at least first and second network domain identifiers. Each of the network domain identifiers can be associated with a respective network service. The network domain identifiers can have a first number of bits. The device can transmit, to a first access point, an access request message for establishing the network service associated with at least one of the network domain identifiers. The access request message can include a third network domain identifier associated with a plurality of network services. The third network domain identifier can include a sequence of bits based on the first or second identifier. The bit length of the sequence of bits can be less than the first number of bits an access request message for establishing the network service associated with at least one of the network domain identifiers. The device can receive, from a second access point, a broadcast access response message establishing the network service. The access response message can include the second network domain identifier. The second network domain identifier can include the third network domain identifier combined with an additional identifier.

In one implementation, one or more embodiments described above with respect to the sections titled "Dynamic Probe Response, "Compressed Beacon," and "Service Load Information," and with respect to FIGS. 8, 9, 10, 14, 15, and 16, can be combined. For example, a wireless communication device can receive, from a network service provider, a first message indicating a characteristic for each of one or more network services for obtaining the network service in the wireless communication system. The wireless communication device can select a network service of the one or more network services to associate with based on the characteristics. The wireless communication device can queue for transmission a first message for requesting information to obtain the network service. Before transmission of the message, the wireless communication device can receive a second message comprising the information. The wireless communication device can remove the message from the queue when the second message comprises the information.

As another example, an access point can provide a network service configured to communicate via a plurality of channels. The access point can determine a characteristic of the network service comprising a load value for each of the plurality of channels. The access point can transmit a message advertising the network service and indicating the characteristic of the network service. The access point can receive a plurality of access requests from a plurality of devices. The access point can determine demand for wireless communication based on the plurality of access requests. The access point can modify a broadcast of the message advertising the network service based on the determined demand.

In one implementation, the processes of the present application can be combined with the described use of a network domain identifier to further expedite association. A network domain identifier can be used to identify a plurality of physical network entities such as access points. A network domain identifier can be associated with a network operator or network service provider. A network domain identifier can include one or more of a value identifying a specific network operator and/or telecommunication service provider, a value identifying an application, a value identifying a class of an application (e.g., chat, text, video, multimedia), and a universal resource location (e.g., website address). An example of a network domain identifier is a public land mobile network identifier.

In one implementation, a mobile device can obtain a network domain identifier associated with the network operator for the mobile device. In some implementations, the mobile device can identify a specific access point to connect with For example a probe request 210 to the access point or a beacon 205 from the access point can include a unique identifier for the access point. This process generally includes the generation, transmission, and processing of several messages between the access point and the mobile device. In situations where multiple devices are attempting access, such as the train station, this can increase the network traffic.

As will be described in further detail below, the mobile device can use the network domain identifier to establish a link with an access point. On the access point side, multiple access points can be installed which can service the request. The access points can perform coordination as to which access point will service the mobile device. This can shift traffic from an otherwise loaded access point to a less utilized access point. On the mobile device, the access request can be transmitted without first identifying a specific access point to connect with. This can reduce the signaling traffic needed for the mobile device to access the network. From both the access point and the mobile device, the reduced signaling and the multiple access point load management can expedite the establishment of a network link for mobile devices.

In one implementation, the processes of the present application can be combined with the described systems and methods for altering access response messaging based on access request volume. For instance, an AP can be configured to transmit association information which receiving devices can use to associate with the AP. In some implementations, such as the train station described above, it can be desirable to increase how often the association information is transmitted. This can increase the opportunities for devices to obtain the association information. Conversely, at low traffic times, it can be desirable to reduce how often the association information is transmitted. This can provide, as a non-limiting advantage, conservation of AP resources (e.g., power, bandwidth, processing, memory, etc.).

In a further implementation, the processes of the present application can be combined with the described transmission of access response messages during a determined window of time. For example, consider an AP which has received several association requests within a short period of time. The AP can service each one in series such that an association response is transmitted prior to servicing a subsequent request. This includes the AP switching from a transmit to receive mode to complete each request. In some implementations, it can be desirable to collect a number of responses for transmission, determine the time needed to transmit the responses, and transmit the responses during the reserved period. This can allow the AP to more efficiently handle each the association requests which provides, as one non-limiting advantage, a more efficient overall association process.

In yet another implementation, the processes of the present application can be combined with the described transmission of service load information for selecting a service for association. For example, an access point can include channel load information for its channels and/or channels provided by other nearby access points. A receiving terminal can determine which channel will provide the best service for the intended communications. For example, if the terminal is requesting access for a call, the radio access requirements can be different than a terminal requesting access to view a video. By receiving this information prior to associating with an AP, the terminal can identify an appropriate AP for association.

An AP can also control its load levels by including an indication that no new associations are being accepted. Providing this information before an access request is received prevents the AP from servicing and denying the access request when the AP is not accepting new association requests. The terminal can determine that the AP is not receiving new association requests, and avoid transmitting an association request that would otherwise be denied. This results in resource savings (e.g., power, processing, bandwidth, memory) for both the terminal and the access point.

In still another implementation, the processes of the present application can be combined with the described systems and methods for identifying an access point for association. When fewer bits are transmitted, less power is used for the transmission, less time is used to transmit the signal, and fewer bits need to be processed for transmission/reception. In some implementations, a shortened identifier can be used to indicate an AP to associate with. The shortened identifier can be a portion of a larger unique identifier for the AP. However, from a terminal perspective, knowledge of a specific AP is not required so long as the terminal can associate with an AP of their service provider. As such, the shortened identifier can be used to associate with an AP. Multiple APs can be identified by the shortened identifier, however the APs can determine which will ultimately service the request. For example, backhaul signaling between the APs can arbitrate which AP will respond to the association request. The arbitration can be based on the load for the APs whereby associations can be directed to the AP featuring the lowest load level.

In another implementation, the processes of the present application can be combined with the described back-off for initiating device association. In some wireless communication systems, a terminal is associated with a time slot. The time slot represents a period of time during which the terminal can transmit and/or receive information. Each system includes a discrete number of time slots (e.g., 50). In one setting, each slot can be assigned to a single device. If the number of time slots is 50, this would accommodate 50 devices. Consider a train station where 50 passengers arrive, each carrying a wireless device. Each device can transmit an association request during their associated time slot. This can result in the AP receiving 50 association requests in rapid succession. In some implementations, it can be desirable to provide a further delay in transmitting the association request such that some of the devices transmit the association requests and, later, the remaining devices transmit the association request. By diversifying the messages received by the AP, the AP can more efficiently process each request. For example, when 50 access requests are pending, an AP can be configured to respond more slowly than had 25 requests been pending due to the signaling for establishing each association.

Consider further, a train station where 100 passengers arrive, each carrying a wireless device. In such a scenario, multiple devices can be assigned the same time slot. Within the time slot, it can be desirable for a terminal to defer transmission of an association request to avoid collision with another device sharing the time slot. For instance, if a time slot is 100 microseconds, it can be desirable for a first and a second device a sharing the time slot to transmit the association request at different times within the time slot. Accordingly, the devices can determine a period of time to wait to transmit the respective association request. This can ease the processing requirements on the AP which is accompanied by the above mentioned resource savings. This can also improve the association response time which can conserve resources at the terminal which would otherwise be spent waiting for the response.

Various aspects of the novel systems, apparatuses, and methods are described more fully hereinafter with reference to the accompanying drawings. The teaching's disclosure can, however, be embodied in many different forms and should not be construed as limited to any specific structure or function presented throughout this disclosure. Rather, these aspects are provided so that this disclosure will fully convey the scope of the disclosure to those skilled in the art. Based on the teachings herein, one skilled in the art will appreciate that the scope of the disclosure is intended to cover any aspect of the novel systems, apparatuses, and methods disclosed herein, whether implemented independently of or combined with any other aspect disclosed. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in the memory 706 (FIG. 7)) and the like. Also, "determining" can include resolving, selecting, choosing, establishing and the like. Further, a "channel width" as used herein can encompass or can also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, the DSP 720 (FIG. 7) (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. The processor 704 (FIG. 7) can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above should also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

The functions described can be implemented in hardware, software, firmware or any combination thereof. If implemented in software, the functions can be stored as one or more instructions on a computer-readable medium. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects can include a computer program product for performing the operations presented herein. For example, such a computer program product can include a computer readable medium having instructions stored (and/or encoded) thereon, the instructions being executable by one or more processors to perform the operations described herein. For certain aspects, the computer program product can include packaging material.

Software or instructions can also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and processes described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and processes described herein to a device can be utilized.

It is to be understood that the claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. A method of reducing signaling in a wireless communication system, the method comprising:
    receiving, at a wireless communication device from a network service provider, an identifier and a characteristic for each of one or more network service devices for obtaining a network service from one or more network services in the wireless communication system, each network service device configured to communicate via a plurality of wireless local area network channels provided by the devices, and the characteristic for each of the one or more network service devices comprising a load value for each of the plurality of channels provided by the devices;
    selecting, at the wireless communication device, a network service device of the one or more network service devices to associate with based on the received identifiers and characteristics, wherein the received identifiers comprise an identifier that indicates that no new associations are being accepted for an associated network service device; and
    transmitting, from the wireless communication device to a provider of the selected network service device, a message to associate with the selected network service device.

2. The method of claim 1, wherein the load value for each of the plurality of channels is determined by calculating the load value over a period of time based on at least one of a number of access requests for each channel, a quantity of data communicated by each channel, a number of devices accessing each channel, and a number of access responses for each channel.

3. The method of claim 1, wherein the received identifiers comprise an identifier that is included in a beacon signal.

4. The method of claim 1, wherein the load value for each of the plurality of channels is determined based on at least one of a number of access requests for each channel, a quantity of data communicated by each channel, a number of devices accessing each channel, and a number of access responses for each channel.

5. The method of claim 4, wherein selecting the network service device comprises:
    identifying the network service associated with the lowest load value as compared to other network services of the one or more network service devices; and
    selecting the identified network service.

6. The method of claim 4, wherein selecting the network service device comprises:
    obtaining a threshold load value; and
    selecting the network service based on a comparison between the load value for each of the one or more network services and the threshold value.

7. The method of claim 6, wherein the selected network service device comprises the network service having a load value less than the threshold value.

8. The method of claim 1, wherein the one or more network services are provided by a plurality of networks.

9. The method of claim 1, wherein the load value for each of the plurality of channels is determined based on at least one of a number of access requests for each channel and a number of access responses for each channel.

10. The method of claim 1, wherein selecting the network service device is further based on the indication that no new associations are being accepted.

11. The method of claim 1, further comprising transmitting a probe request, and wherein the received identifiers comprise an identifier that is received via a probe response.

12. A device configured to reduce signaling in a wireless communication system, the device comprising:
    a receiver configured to receive, from a network service provider, an identifier and a characteristic for each of one or more network service devices for obtaining a network service from one or more network services in the wireless communication system, each network service device configured to communicate via a plurality of wireless local area network channels provided by the devices, and the characteristic for each of the one or more network service devices comprising a load value for each of the plurality of channels provided by the devices;

a service selection circuit configured to select a network service device of the one or more network service devices to associate with based on the received identifiers and characteristics, wherein the received identifiers comprise an identifier that indicates that no new associations are being accepted for an associated network service device; and a transmitter configured to transmit, from the device to a provider of the selected network service device, a message to associate with the selected network service device.

13. The device of claim 12, wherein the load value for each of the plurality of channels is determined by calculating the load value over a period of time based on at least one of a number of access requests for each channel, a quantity of data communicated by each channel, a number of devices accessing each channel, and a number of access responses for each channel.

14. The device of claim 12, wherein the received identifiers comprise an identifier that is included in a beacon signal.

15. The device of claim 12, wherein the load value for each of the plurality of channels is determined based on at least one of a number of access requests for each channel, a quantity of data communicated by each channel, a number of devices accessing each channel, and a number of access responses for each channel.

16. The device of claim 15, wherein the service selection circuit is configured to select the network service device by being configured to:
identify the network service associated with the lowest load value as compared to other network services of the one or more network service devices; and
select the identified network service.

17. The device of claim 15, wherein the service selection circuit is configured to select the network service device by being configured to:
obtain a threshold load value; and
select the network service based on a comparison between the load value for each of the one or more network services and the threshold value.

18. The device of claim 17, wherein the selected network service device comprises the network service having a load value less than the threshold value.

19. The device of claim 12, wherein the one or more network services are provided by a plurality of networks.

20. The device of claim 12, wherein the load value for each of the plurality of channels is determined based on at least one of a number of access requests for each channel and a number of access responses for each channel.

21. The device of claim 12, wherein the service selection circuit is further configured to select the network service device further based on the indication that no new associations are being accepted.

22. The device of claim 12, wherein the transmitter is further configured to transmit a probe request, and wherein the received identifiers comprise an identifier that is included in a probe response.

23. An apparatus for reducing signaling during link setup in a wireless communication system, the apparatus comprising:
means for receiving, from a network service provider, an identifier and a characteristic for each of one or more network service devices for obtaining a network service from one or more network services in the wireless communication system, each network service device configured to communicate via a plurality of wireless local area network channels provided by the devices, and the characteristic for each of the one or more network service devices comprising a load value for each of the plurality of channels provided by the devices;
means for selecting a network service device of the one or more network service devices to associate with based on the received identifiers and characteristics, wherein the received identifiers comprise an identifier that indicates that no new associations are being accepted for an associated network service device; and
means for transmitting, from the wireless communication device to a provider of the selected network service device, a message to associate with the selected network service device.

24. A non-transitory computer-readable storage medium comprising instructions executable by a processor of a device in a wireless communication system, the instructions causing the device to:
receive, from a network service provider, an identifier and a characteristic for each of one or more network service devices for obtaining a network service from one or more network services in the wireless communication system, each network service device configured to communicate via a plurality of wireless local area network channels provided by the devices, and the characteristic for each of the one or more network service devices comprising a load value for each of the plurality of channels provided by the device;
select a network service device of the one or more network service devices to associate with based on the received identifiers and characteristics, wherein the received identifiers comprise an identifier that indicates that no new associations are being accepted for an associated network service device; and
transmit, from the device to a provider of the selected network service device, a message to associate with the selected network service device.

* * * * *